(12) United States Patent
Sikri et al.

(10) Patent No.: US 11,310,800 B2
(45) Date of Patent: Apr. 19, 2022

(54) MULTI-BEAMFORMING SYSTEM AND METHOD

(71) Applicant: SATIXFY UK LIMITED, Farnborough (GB)

(72) Inventors: Divaydeep Sikri, Sutton (GB); Moche Cohen, Reading (GB); Doron Rainish, Ramat Gan (IL)

(73) Assignee: SATIXFY UK LIMITED, Farnborough (GB)

(*) Notice: Subject to any disclaimer, the term of this patent is extended or adjusted under 35 U.S.C. 154(b) by 84 days.

(21) Appl. No.: 16/963,746

(22) PCT Filed: Jan. 20, 2019

(86) PCT No.: PCT/IL2019/050076
§ 371 (c)(1),
(2) Date: Jul. 21, 2020

(87) PCT Pub. No.: WO2019/142197
PCT Pub. Date: Jul. 25, 2019

(65) Prior Publication Data
US 2020/0359369 A1 Nov. 12, 2020

(30) Foreign Application Priority Data

Jan. 21, 2018 (IL) .......................................... 257059

(51) Int. Cl.
*H04W 72/04* (2009.01)
*H04W 16/28* (2009.01)

(52) U.S. Cl.
CPC ......... *H04W 72/046* (2013.01); *H04W 16/28* (2013.01)

(58) Field of Classification Search
CPC .. H04W 72/042; H04W 76/27; H04L 5/0053; H04L 5/0007; H04L 5/0055
(Continued)

(56) References Cited

U.S. PATENT DOCUMENTS 5,917,447 A 6/1999 Wang et al.
7,009,560 B1 3/2006 Lam et al.
(Continued)

FOREIGN PATENT DOCUMENTS

WO 2015160431 A1 10/2015
WO 2017153985 A1 9/2017

*Primary Examiner* — Shuwang Liu
*Assistant Examiner* — Gina M McKie
(74) *Attorney, Agent, or Firm* — Browdy and Neimark, PLLC

(57) ABSTRACT

A method and system/circuit for multi-beamforming signal processing are provided. The circuit includes a plurality of basic modules associated with a plurality of transducers. Each basic module includes a first and second processing stages operative for introducing time delays of higher and lower temporal resolutions to the signals processed thereby respectively, and a path selector multiplexer module managing the signal coupling between the first and second stages. The first processing stage is connectable to one of the transducers via a first port and includes a network of first type time delay channels defining L signal paths operative at a relatively high sampling rate and adapted for providing L respectively different time delays of high temporal resolution. The second processing stage includes an array of N second type time delay channels operable for shifting signals processed thereby by any number up-to K samples of a lower sampling rate.

24 Claims, 6 Drawing Sheets

(58) Field of Classification Search
USPC .......................................................... 370/329
See application file for complete search history.

(56) References Cited

U.S. PATENT DOCUMENTS

| | | |
|---|---|---|
| 7,394,424 B1 | 7/2008 | Jelinek et al. |
| 8,698,696 B1 | 4/2014 | Mccandless |
| 9,680,553 B1 | 6/2017 | Tiebout et al. |
| 9,735,469 B1 | 8/2017 | West et al. |
| 10,432,283 B2 * | 10/2019 | Rainish .................... H01Q 3/38 |
| 2002/0140616 A1 | 10/2002 | Kanamaluru et al. |
| 2008/0240170 A1 | 10/2008 | Elmala et al. |
| 2010/0277371 A1 | 11/2010 | Markus et al. |
| 2017/0163328 A1 | 6/2017 | Tiebout et al. |

* cited by examiner

MULTI-BEAMFORMING SYSTEM AND METHOD

TECHNOLOGICAL FIELD

This invention is in the field of beamforming techniques, and relates in particular to a multi-beam forming system and method, specifically useful in phased array antennas.

BACKGROUND

Phased array antennas (PAAs) offer many advantages including electronic beam steering and scanning, optimized beam pattern with reduced sidelobes, and reduced power consumption and weight. True-time-delay (TTD) steering techniques are typically required for controlling operation of multiple antenna elements in the array, while keeping the broad bandwidth of the antenna radiation and allowing a large scan angle, so that efficient elemental vector summation (in the receive mode) or distribution (in the transmit mode) can be obtained that is independent of frequency or angle.

Various beam forming techniques for use in such antennas have been developed, and are described for example in the following patent publications: US2002140616; U.S. Pat. No. 8,698,696; US2010277371.

GENERAL DESCRIPTION

There is a need in the art for a novel beamforming technique, especially useful for multiple-beam forming typically required in phase array antennas and/or satellite communication techniques.

The invention provides a novel architecture for a digital beamformer which can support a wide range of signal bandwidths (from low bandwidths to wide signal bandwidth) by digitally implementing true-time delay functionality at reduced complexity. This novel architecture lends itself to support multi-beams at a small incremental cost over single beams.

According to the invention, each antenna element of an antenna array is associated with a complete independent digital chain (termed at times hereinbelow as "basic module") for introducing true time delays to the signal(s) of the antenna for multiple beam forming while also adjusting the sampling rate of the signals in between the relatively low sampling rate of the beam forming processor and the relatively high sampling rates of the antenna operation.

In some aspects of the invention, several basic modules can be implemented in a single chip that can support a number of antenna elements.

True time delay beamforming is accomplished in the digital baseband which provides to support wide bandwidth signal and large electronically steerable antennas.

The invention also provides a network of time delay circuits and synchronizers interlaced with system of decimators and interpolators to provide a flexible and low complexity system with the ability to scan from 0-90 degrees elevation and 360 degree azimuth when used with appropriate antenna array structure, such as conformal array. The true time delay functionality is implemented as quantized integer delays.

The architecture employs a channelizer to implement true time delay and spreads the delay correction in tree form based on the minimum resolution required for timing correction throughout each chain allowing simplification of not needing independent chains with its own delays for each beam. This enables to group all the beams into a small number of beam clusters based on delay which is a function of beam direction.

The technique of the invention allows a large number of beams without incremental power consumption based on beam direction. By choosing specific beam directions, one can see how the system supports multibeams and how its power consumption increases as a function of the number of beams.

Thus, according to one broad aspect of the present invention there is provided a signal processing circuit. The signal processing circuit includes a plurality of basic modules associated with a respective plurality of antenna elements. Each basic module of the basic modules is configured for connection in between a first port (e.g. here the term port is used to designate a signal port/connection (such as connectors of antenna or acoustic transducer, and/or digital/analogue connection/port frontend circuits of such modules) associated with a respective antenna element of the plurality of antenna elements and a plurality of N second signal/data ports (e.g. here the term signal/data port is used to designate any type of signal/data port/connection (e.g. physical or virtual port/channel) such as for instance a respective channel/port of a data de-multiplexer module connected to a data/signal bus that propagates multiple data streams/signals (e.g. in various implementations the N second signal/data ports may include, or be associated with, any one or more of the following: down-converter, ADC, digital filtering and data decimation). Generally, according to the technique of the present invention the signals at the first port (i.e. from the first end of the basic module which is associated with the respective antenna element, directly or indirectly for instance via respective front end channel) are provided with at least a first sampling rate $SR_1$. Also, according to the technique of the present invention the signals/data-streams at plurality of N second signal/data ports (i.e. from the second end of the basic module which is associated with communication of beams' signals/data-streams to/from the basic module) are provided with a second sampling rate $SR_2$ lower than the first sampling rate $SR_1$, such that $SR_2 < SR_1$. In turn, the basic module includes: at least a first and a second successive processing stages, which are connected respectively to the first signal port and to the N second signal/data ports, and which are connected between them via a path selector multiplexer module that is configured and operable for managing/controlling the signal coupling between the first and second successive processing stages. The first and a second successive processing stages are operative for introducing time delays with respective temporal resolutions of the first and second sampling rates, $SR_1$ and $SR_2$. In other words, the first processing stage is configured and operable for introducing to the signals/data-streams processed thereby, time delays with high/fine resolution associate with the first/higher sampling rate, $SR_1$ (e.g. time delays with durations as small as $T_1 \sim 1/SR_1$. The second processing stage is configured and operable for introducing to the signals/data-streams processed thereby, time delays with substantially lower temporal resolution, e.g. which may be as low as the second/lower sampling rate, $SR_2$ (e.g. time delays with durations $T_2 \gg 1/SR_1$, which may be optionally may be not smaller than $T_2 \sim 1/SR_2$, or more generally in some implementations $1/SR_2 > T_2 \gg 1/SR_1$). Thus, the first stage handles the high resolution time delays and the second stage handles the lower resolution time delays of the signals (e.g. beams' signals) of the respective antenna element of the basic module. In this regards it should be understood that in the scope of the present discloser the temporal resolution of time delays that can be introduced to a digital signal is generally linked-to, and limited by, the sampling rate of the digital signal. This is because it is generally impossible, at least not in a straight forward way, to introduce to a digital signal of a certain sampling rate, temporal delays of higher resolution than the sampling rate. In other words, it is generally impossible to introduce time delays of duration shorter than the time duration of a single sample of the signal (this is with the exception of using more complex manipulations such as interpolated—resampling of the signal by which a resampled signal approximating such short delays may in some cases be obtained).

In some implementation the signal processing circuit is configured as follows:

(i) the first processing stage includes a network of first type digital time delay channels connectable via one or more signal splitters/combiners to define L signal paths through the network capable of introducing L different time delays of temporal resolution higher than the second sampling rate $SR_2$;

(ii) the second processing stage includes an array of N second type digital time delay channels connected to said N second signal/data ports, respectively, and each of the second type digital time delay channels being operable at the second sampling rate $SR_2$ for shifting a signal communicated therethrough by any number between 0 and K samples of the second sampling rate; and (iii) the path selector multiplexer module includes a set of switches configured and operable for selectively linking any one of the L signal paths with any one or more of the N second type digital time delay channels.

In such implementations, the first processing stage may include L ports (referred to herein as L network ports) such that the L signal paths are paths defined between the first signal port and the L network ports respectively. These L signal paths may be fixed/static paths in the sense that they are configured and operable for introducing L different time delays of fixed delay magnitudes (e.g. the delay introduced by each path may not be adjustable and the selection of which high resolution delay is applied to each signal depends on the specific path of the L paths by which the respective signal is processed). The N second type digital time delay channels of the second processing stage, may on the other hand be adjustable/controllable time delay channels.

To this end, the signal processing circuit of the present invention may be used for forming multiple beams (in receipt or transmit mode), and thus may actually be configured and operable as a multibeam signal processing circuit. The time delays are introduced to the signals (beam components) of each antenna element, by the two, first and second successive processing stages of the respectively relatively higher and relatively lower temporal resolutions, SR1 and SR2. The first and second successive processing stages may be connectable to one another via the path selector multiplexer module, whereby the latter is configured and operable selectively linking any one of the L paths of the first stage (providing the high resolution temporal delays), with any one or more of the N digital time delay channels that provide the relatively low resolution time delays. Accordingly, this combination of elements of the present invention allows to handle the time delay of the N signals (e.g. beam components of the antenna element) by using L high temporal resolution time delays channels/paths, and N low temporal resolution time delay channels.

It should be noted that in the configuration of the present intention the number L of high resolution time delays channels/paths of the first stage may in some implementations (depending of the ratio SR1/SR2) may be smaller than the number N of beam components, which are to be transmitted/received by the antenna element (this depends on the number N of beam components which are to be handled simultaneously by the system/circuit of the invention and the ratio SR1/SR2 by which the number of paths L may be defined). To this end according to the technique of the present invention the number of high temporal resolution delay channels (first type digital time delay channels) may be independent of the number of N signals (e.g. beam components) whose delays need to be simultaneously adjusted, and the present invention facilitates configurations in which the number of high temporal resolution delay channels/paths L are smaller than the number N of signals/beam-components which are to be handled by the circuit. This is because the above combination of features facilitates the concurrent use of each high temporal resolution delay channels/paths L of the first stage for simultaneous processing/delay of more than one of the N signals/beam-components.

According to some embodiments, the number N of the second type digital time delay channels corresponds to a maximal number of beam components to be received or transmitted through respective N paths of each of the basic modules, to form together multi beam operation mode of the plurality of antenna elements.

Thus, according to some embodiments, the number L of signal paths in the first stage are about $L \cong SR_1/SR_2$ signal paths adapted for introducing the L different time delays as fixed time delays; and each of the second type digital time delay channels are configured as an adjustable signal sampling shifter operable at the second sampling rate. As indicated above, in some implementations the first processing stage of the multi beam signal processing circuit includes a network of first type digital time delay arranged/connected to define L signal paths of L high resolution time delays through the network. In this regards, in some embodiments, the first type digital time delay channels are arranged in M>1 processing levels, wherein the first type digital time delay channels of each level are operable with a certain different sampling rate. In this connection it should be understood that the sampling rate $SR_1$ of the first stage is considered to be the sampling rate of the processing level having the highest sampling rate among the processing level, as this effectively matches/corresponds to the high temporal resolution of time delays that can be introduced by the first stage (e.g. regardless if other processing levels of the first stage operate at lower sampling rates).

To this end, for example, each of the first type digital time delay channels is configured and operable for shifting signals communicated therethrough by a certain number from 0 to S samples of the sampling rate of the respective level and applying sampling rate conversion filtration to the signal, for converting a sampling rate of said signal in between said sampling rate of the respective level and a predetermined different sampling rate.

Thus, according to some embodiments, the number M of the processing levels is higher than 1, and the first type digital time delay channels are arranged in a cascade in which the first type time delay channels of a lower level in the cascade operate at lower sampling rate than the first type digital time delay channels of a higher level in the cascade.

For example, in some embodiments the cascade arrangement has a tree topology defining said L paths between the first port (also referred to herein as transceiver port) and the L ports of the network (i.e. the L network ports), thereby reducing a total number of taps required for the resampling filtration (decimation/interpolation filtration of the sampling rates). In this case the one or more signal splitters/combiners may be connected to the first type digital time delay channels and arranged to define the tree topology. In some embodiments the tree topology is of a tree-degree D, where D≥2. The resampling may be configured to modify the sampling rate of the respective signal by a factor of D, and said number M of the levels is determined as $\log_D$ of a ratio between the first sampling rate $SR_1$ and the second sampling rate $SR_2$.

In some implementations the tree topology is a binary tree topology. Each of the first type digital time delay channels is configured and operable for shifting signals communicated therethrough by either 0 or 1 samples of the sampling rate of the respective level. In this case the resampling may be configured to modify the sampling rate of the respective signal by a factor of 2, and the number M of the levels may be $\log_2$ of a ratio between the first sampling rate $SR_1$ and the second sampling rate $SR_2$.

According to some embodiments of the present invention, the multi beam signal processing circuit/system of the present invention further includes a multibeam forming processor adapted for receiving input data indicative of directionality of multiple beams to be produced by the multi beam signal processing circuit. The beam forming processor is configured to determine, based on said input data, time delays to be introduced by the N paths in each of the basic blocks/modules in order to form the multiple beams. According to some embodiments of the present invention, the system is configured and operable in reception mode for processing an input signal received through said first port (e.g. transceiver port) and output plurality of N output signals via the N second signal ports respectively. The N output signals are similar signals delayed with respect to one another by predetermined time delays introduced via the first and second processing stages. To this end, in some implementations each of the first type digital time delay channel may include a sampling rate down converter and a decimation filter adapted for carrying out said sampling rate conversion filtration to reduce the sampling rate of the signal; and each of the one or more signal splitter/combiners includes at least a signal splitter.

According to some embodiments of the present invention, the multi beam signal processing circuit is configured and operable in transmission mode for processing a plurality of N input signals received through said N second signal ports respectively, to output a combined output signal via the first port (e.g. transceiver port). The combined output signal is formed as a combination of N input signals with predetermined time delays between them introduced via the first and second processing stages. In this case, each of the first type digital time delay channel may include a sampling rate up converter and a resampling interpolation filter for carrying out the sampling rate conversion filtration to increase the sampling rate of the signal; and each of the one or more signal splitter/combiners may include at least a signal combiner.

According to some embodiments of the multi beam signal processing circuit, each second signal port of said N second signal ports includes a complex weight multiplier adapted for multiplying the signal communicated via said second signal port by an input complex weight factor for adjusting the phase of the communicated signal.

According to some embodiments the first/transceiver signal port includes one or more of the following:
   a. a digital to analog converter (DAC) or analog to digital converter (ADC);
   b. a numerically controlled oscillator; and
   c. a global sampling rate conversion module;
   d. signal mixer adapted for mixing the signal, which is received or to be transmitted by the antenna element, by the carrier frequency components, so as to up/down convert the signals in between the carrier's frequency band (passband) to the baseband signal (up-convert in transmission operation and/or down convert in reception operation).

According another broad aspect of the present invention there is provided a multi beam signal processing circuit including a plurality of multibeam digital true time delay networks (also referred to herein as basic modules) associated with a respective plurality of antenna elements. Each of the multibeam digital true time delay networks (basic modules) is configured for connection in between a first transceiver port (which is operable with a first sampling rate $SR_1$ and connectable with a respective one of the antenna elements) and a plurality of N second signal ports each operable with a second sampling rate $SR_2$. The sampling rates $SR_2$ and $SR_1$ satisfy $SR_2<SR_1$. The multibeam digital true time delay network includes: first and second successive processing stages connected to, respectively, the first and second signal ports, and a path selector multiplexer module for managing signal coupling between the first and second successive processing stages, wherein:

(i) the first processing stage, which is actually a multipath high resolution time delay processor/filter, includes a network of first type digital time delay channels connectable via one or more signal splitters/combiners to define L signal paths through the network having different respective time delays between the first transceiver port and a corresponding plurality of L network ports. The first type digital time delay channels are arranged in M≥1 number of processor levels. Each level is operable with a certain different sampling rate, such that each of the first type digital time delay channels is configured and operable for shifting signals communicated therethrough by a certain number from 0 to S samples of the sampling rate of the respective level, and applying sampling rate conversion filtration to the signal. The sampling rate conversion is adapted for converting a sampling rate of the signal in between said sampling rate of the respective level and a predetermined different sampling rate. The network of the first stage thereby introduces a plurality of different time delays to signals in the corresponding plurality of L network ports:

(ii) The second processing stage includes an array of N second type digital time delay channels connected to said N second ports, respectively. Each of the second type digital time delay channels is operable at the second sampling rate for shifting signals communicated therethrough by any number between 0 and K samples of the second sampling rate; and (iii) the path selector multiplexer module includes a set of switches configured and operable for selectively linking between said L network ports and said N second type digital time delay channels.

According to yet another aspect of the invention there is provided a digital chip (semiconductor integrated circuit) implementing the multi beam signal processing circuit according to any one of the embodiments which are described above, and which are described in further detail below.

According to further aspect of the invention there is provided an antenna device including: a plurality of antenna elements operable in a multi-beam mode, and the multi beam signal processing circuit of any one of the embodiments which are described above, and which are described in further detail below.

Additionally, according to another aspect of the invention there is provided a multipath time delay filter configured to define a plurality of L paths for connecting in between at least a first port, operative at a high sampling rate, and a plurality of L network ports operative at lower sampling rates. The plurality of L paths are configured and operable for converting the signals sampling rate between the high sampling rate of the first port and the low sampling rate of the L network ports and respectively introducing to the signals passing through the L paths, different time delays with resolution of the high sampling rate.

Yet additionally, according to another aspect of the present invention there is provided a multipath time delay filter including at least one basic module being configured for connection between a first signal port operable with a signal sampled at a first sampling rate $SR_1$ and a plurality of N second signal ports operable with signals sampled at a second sampling rate $SR_2$, wherein $SR_2<SR_1$. The basic module includes: first and second successive processing stages connected respectively between the first signal port and the second signal ports, and a path selector multiplexer module adapted for managing signal coupling between the first and second successive processing stages. The first processing stage is configured to define a plurality of L paths for connecting in between at least said first signal port, operative at the first sampling rate $SR_1$, and a plurality of L network ports operative at lower sampling rates, whereby the plurality of L paths are configured and operable for converting the signals' sampling rate between the first sampling rate $SR_1$ of the first port and the lower sampling rate of the L network ports and respectively introducing to the signals passing through the L paths, different time delays with resolution of the first sampling rate $SR_1$. The second processing stage comprises an array of N second type digital time delay channels connected to said N second signal ports, respectively, and each of the second type digital time delay channels being operable for shifting a signal communicated therethrough by any number between 0 and K samples of the second sampling rate $SR_2$. The path selector multiplexer module is configured and operable for selectively linking any one of said L network ports with any one or more of said N second type digital time delay channels.

In some embodiments the multipath time delay filter (e.g. at least the first processing stage thereof—in case it include two or more processing stages) includes a tree topology network of time delay channels having a plurality of tree-levels, connected in between the first port and said L ports and defining the plurality of L paths. Each level in the tree topology network is operative at a different sampling rate and the time delay channels of each level are configured and operable for offsetting the signals processed thereby by an integer number, greater or equal to zero, of samples of the sampling rate of the level, and converting the sampling rate of the signal to the sampling rate of a next level in the tree topology network.

According to some aspects, the present invention provides a signal processing circuit including the multipath time delay filter, which is described above and in more detail below.

In some embodiments, the signal processing circuit includes at least one basic module being configured for connection in between a first transceiver port and being operable with a sampled signal at a first sampling rate $SR_1$ and a plurality of N second signal ports each operable with a second sampling rate $SR_2$ such that $SR_2<SR_1$. The basic module includes: first and second successive processing stages connected to, respectively, the first and second signal ports, and a path selector multiplexer module for managing signal coupling between the first and second successive processing stages, wherein:

(i) the first processing stage includes the multipath time delay filter;

(ii) the second processing stage comprises an array of N second type digital time delay channels connected to said N second ports, respectively, and each of the second type digital time delay channels is operable at the second sampling rate for shifting signal communicated therethrough by any number between 0 and K samples of the second sampling rate; and (iii) the path selector multiplexer module comprises a set of switches configured and operable for selectively linking between said L network ports and said N second type digital time delay channels.

Further aspects and embodiments of the present invention are described in more detail with reference to the accompanying drawings in the detailed description section below.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1C to 1F illustrate various configurations of a multipath digital true time delay filter/network used in the system.

DETAILED DESCRIPTION OF EMBODIMENTS

Figure 1A:
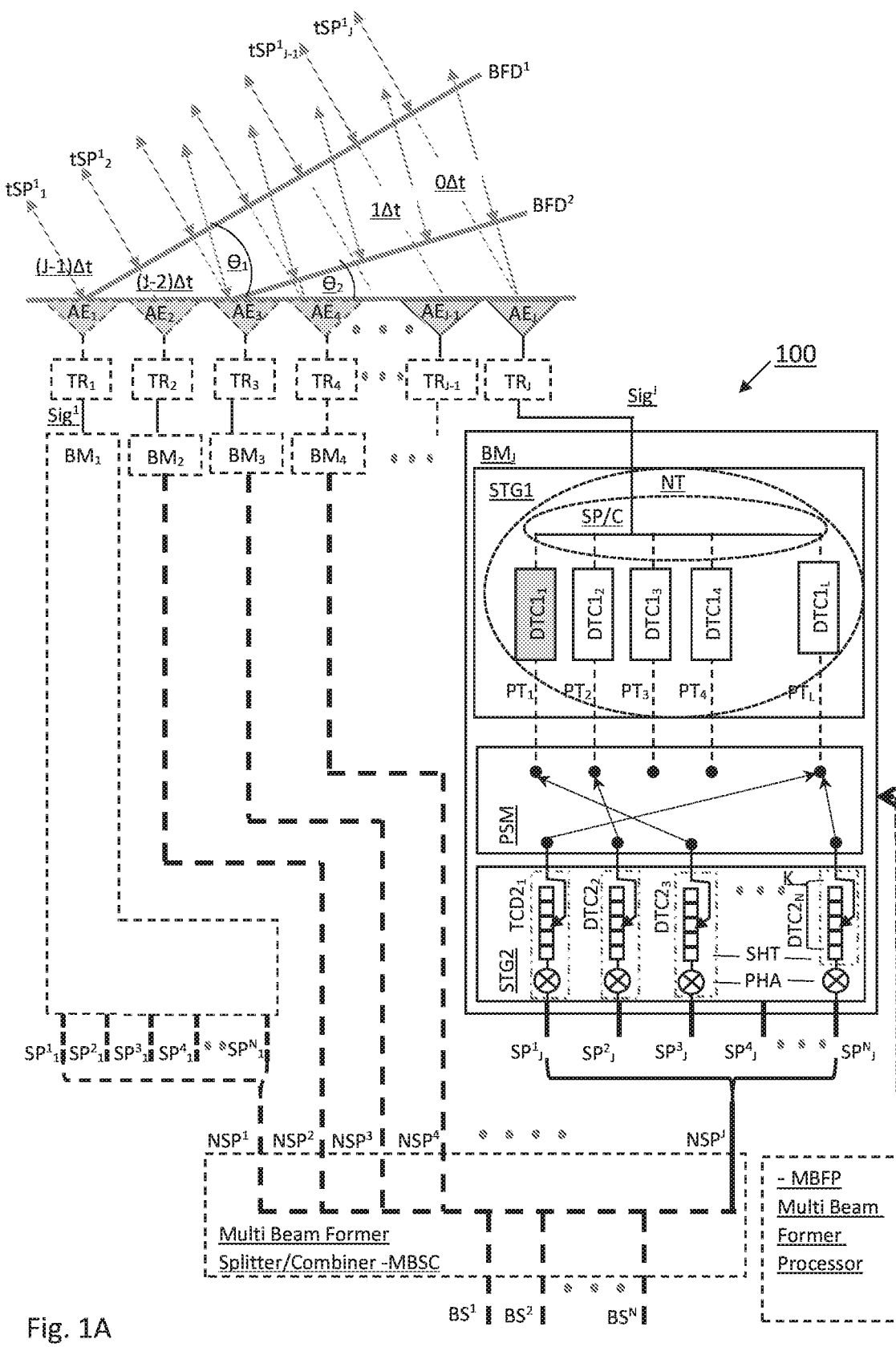
FIGS. 1A to 1F are block diagrams schematically illustrating a multi-beam signal processing system according to an embodiment of the present invention, and various implementation of certain components/modules of the system, whereby

Reference is made to FIG. 1A showing a block diagram of a multi beam signal processing circuit/system 100 (herein also after abbreviated MBSC) according to an embodiment of the present invention. The MBSC 100 includes a plurality (J) of multibeam digital true time delay networks (MDTTDN; also referred to herein as basic modules) $BM_1$ to $BM_J$ associated with respective plurality (J) of transducer ports $TR_1$ to $TR_J$ (e.g. for connecting the system 100 to J antenna/transducer elements $AE_1$ to $AE_J$).

It should be noted that the J transducer elements $AE_1$ to $AE_J$, which may generally be of any transducer type (e.g. antenna elements or acoustic transducer and/or other), are referred to herein for clarity and without loss of generality as antenna elements. The transducer ports $TR_1$ to $TR_J$ may be signal ports for connecting directly or indirectly to the transducer elements $AE_1$ to $AE_J$, and/or they may be transceivers (transmitters or receivers) associated with the transducer elements $AE_1$ to $AE_J$. It should be understood that the term transceiver is used herein to designate any of a receiver module, a transmitter module or a module combining of both receive and transmit functions. The multi beam signal processing circuit/system 100 includes N beam ports $BS^1$ to $BS^N$ for providing data/signals indicative of up to N beams to be received/transmitted by the system 100. Accordingly, each of the J MDTTDN basic modules $BM_1$ to $BM_J$ has up to N signal ports $SP_1$ to $SP_N$ which are connectable to the N beam ports $BS^1$ to $BS^N$ via a Splitter/Combiner module MBSC that is also referred to herein as Multi Beam Former Splitter/Combiner. The N signal ports of each MDTTDN basic module (e.g. $SP^J_1$ to $SP^J_N$ of basic module $BM_J$) are adapted for providing into, and/or out from, the basic module (e.g. $BM_J$) plurality of up to N signal components indicative of the plurality of beams, which are received and/or which are to be transmitted, by the respective antenna/transducer element (e.g. $AE_J$). As described in more detail below, the beams are collectively transmitted/received by the plurality of the antenna/transducer elements $AE_1$ to $AE_J$. Each of the MDTTDN basic modules processes the transmitted/received signal portions of the plurality of beams, while introducing to the signal portion of each beam, an appropriate true time delay so that together with the signal portions of the beam transmitted/received by other antenna elements (processed by other basic modules), the beam will be formed.

It should be noted that the term true time delay is used herein to designate an intentional temporal delay of baseband signal which is function of the direction of arrival of a particular beam to ensure all beams can be coherently summed from different antenna elements. The delayed output of a true time delay operation at a certain time t is generally an exact copy of the input at time t-d, where d is the delay introduced by the operation. In this regard, it should be noted that using the technique of the invention, true time delay can be digitally applied to a digital signal (e.g. sampled signal) indicative of the baseband frequency component of a broadband signal, which is to be transmitted/received. The digital true time delay applied to the baseband component in this way, may provide for introducing to the base band signal both: (i) a time delay of the baseband, and (ii) a corresponding phase shift which affects shifting the phase of the carried frequency components that are being modulated by the baseband signal components when the signal is transmitted or received. Providing both time delay of the baseband signal as well as phase shift of the carrier frequency, enables to achieve accurate beam forming of broadband signals, with reduced or no frequency selectivity artifacts, while also digitally operating on the baseband signal (e.g. at relatively low sampling rates since the frequency of the baseband is generally much lower than the frequency of the carrier. As will be appreciated by those versed in the art of beamforming, the phase shift of the carrier frequency, which is required for achieving accurate beam forming, can be introduced to the baseband signal by means of a complex multiplier, as illustrated for example by elements PHA in FIG. 1 and elements $C(\Theta)$ in FIGS. 2 and 3.

It should be also noted that the system 100 may be configured and operable for transmission mode operation only, in which it forms a plurality of beams (waveforms) transmitted to different directions, or for reception mode operations, in which the waveform received by the plurality of antenna elements is processed/beam-formed to generate a plurality of beam-formed signals associated with the portion of the waveform that are received from the plurality of directions, and/or the system may be adapted for selectively operation in both transmission and reception modes. Accordingly, the terms transceiver and/or transducer are used herein to designate a transmitter, a receiver and/or a module operable for both transmission and reception.

To this end, the system 100 may further include a multi-beam former signal splitter/combiner MBSC which is configured for splitting (in transmission mode) the beams signals $BS^1$ to $BS^N$ to the basic modules $BM_1$ to $BM_J$ for introducing thereby preselected beam forming true time delays thereto and/or selectively combining (in reception mode) the N*J signals $SP^1_1$ to $SP^N_J$ of preselected delays provided by the basic modules $BM_1$ to $BM_J$ so as to form one or more beams transmitted by the antenna elements, and/or combining (in reception mode) the signals $SP^1_1$ to $SP^N_J$ received from the antenna elements and processed (appropriately true time delayed) by the basic modules $BM_1$ to $BM_J$ so as to form one or more received beams signals $BS^1$ to $BS^N$.

The transceivers/transducer ports $TR_1$ to $TR_J$ are configured and operable at a first sampling rate $SR_1$, which is relatively high. Each of the basic modules is configured for connection in between a first port, being one of $TR_1$ to $TR_J$, which is operable at the first/relatively-high sampling rate $SR_1$, and a plurality of N second signal ports $SP_1$ to $SP_N$ that are each operable with a second, lower, sampling rate $SR_2$ ($SR_2 < SR_1$). The first port(s), each of $TR_1$ to $TR_J$, may each be for example a transceiver/transducer port (e.g. including or connectable to a transmitter, receiver and/or transceiver) and are connectable with a respective one of the antenna/transducer elements $AE_1$ to $AE_J$.

As indicated above, in various implementations, the system 100 and the basic modules $BM_1$ to $BM_J$ may be configured for operation in transmission mode, in reception mode and/or configured and operable in both reception and transmission modes.

In reception mode configuration/operation, each basic module, e.g. $BM_J$, is configured for processing signal Sig of the high sampling rate $SR_1$ that is received by its respective antenna element and transceiver, e.g. $AE_J$ and $TR_J$, to form and output a plurality of up to N signals $SP^J_1$ to $SP^J_N$ of lower sampling rate $SR_2$ whereby different true time delays are introduced to the N signals $SP^1_1$ to $SP^1_N$ of the lower sampling rate, as relative to the received signal. More specifically, the N signals $SP^1_1$ to $SP^1_N$ of the lower sampling rate are formed as a lower sampling rate clones/copies of the received signal $Sig^J$ of the high sampling rate $SR_1$, to which different time delays and possibly phase shifts are introduced as compared to the received signal $Sig^J$, as well as down sampling from the higher $SR_1$ to the lower sampling rate $SR_2$. For example, as schematically illustrated in the figure, the basic module $BM_1$ provides the N signals $SP^1_1$ to $SP^1_N$ which are differently delayed and also possibly phased signal clones of the signal $Sig^1$ received by antenna element $AE_1$, and in the same way the basic module $BM_J$ provides the N signals $SP^J_1$ to $SP^J_N$ which are differently delayed and also possibly phased signal clones of the signal Sig received by antenna element $AE_J$, and in the similar manner operating all the basic modules. For clarity, the N signals provided by/from the respective basic modules $BM_1$ to $BM_J$ are indicated in the figure by $NSP^1$ to $NSP^J$ respectively. The multi-beam former signal splitter/combiner MBSC is in this case (reception mode) configured/operable for receiving the N*J signals provided by the basic modules $BM_1$ to $BM_J$ and combining signals of preselected delays received from each antenna so as to form one or more received beams signals $BS^1$ to $BS^N$. Each of the one or more beam signals, e.g. $BS^1$ is formed by combining up to J signals received by up to J respective antenna elements, while being properly respectively delayed by the respective basic modules $BM_1$ to $BM_J$ so as to constructively form a beam from the waveform/signals received from a desired direction. For instance, beam signals $BS^1$ and $BS^2$ may be properly formed combinations for the signals received by the antenna elements such that the beam signals $BS^1$ and $BS^2$ correspond to waveforms received from the directions $BFD^1$ and $BFD^2$ illustrated in the figure (the directions drawn show the wavefronts). The principles of beamforming to particular directions, by introducing appropriate true time delays to the signals of different antennas, are readily known to those skilled in the art and need not be repeated here, except for indicating that the system may include a multibeam forming processor MBFP that is connectable to the basic modules and adapted for operating them to introduce the appropriate time delays to the signals processed thereby. To this end, in reception mode/configuration the system 100 is capable for reception of differently encoded directional beams (beam signals $BS^1$ and $BS^2$) received from different directions.

In transmission mode, the system actually receives up to N beam signals $BS^1$ to $BS^N$ which are to be transmitted to the various directions, e.g. $BFD^1$ and $BFD^2$. The optional multibeam former signal splitter/combiner MBSC splits the up to N beam signal $BS^1$ to $BS^N$ to the basic modules $BM_1$ to $BM_J$. In other words the J basic modules receive respective signal sets $NSP^1$ to $NSP^J$ each comprising signal clones (up to $SP_1$ to $SP_N$) of one or more of the beam signals $BS^1$ to $BS^N$. Each of the basic modules, e.g. $BM_J$, is configured for processing its respective set of up to N signals, e.g. $NSP^J$, which are provided with low sampling rate $SR_2$ to form and output a combined signal of a higher sampling rate $SR_1$, e.g. $Sig^J$, to be transmitted via the respective antenna element $AE^J$. The combined signal $Sig^J$ of the basic module $BM_J$, is formed as a combination of the plurality of up to N signals $NSP^J$ whereby the N signals of lower sampling rate are differently true time delayed (time delayed and also phase delayed) before being combined by the basic module $BM_J$, so as to form respective components of up to N beams that are to be transmitted via the antenna module.

To this end, FIG. 1A illustrates two simultaneous beams BFD1 and BFD2 formed in different respective directions $\Theta_1$ and $\Theta_2$. FIG. 1A also illustrates the correspondence between the waveform signals $tSP^1_1$ to $tSP^1_J$ of the $1^{st}$ beam BFD1 that are transmitted/received by the respective antenna elements $AE_1$ to $AE_J$ and the respective signals $SP^1_1$ to $SP^1_J$ that are processed by the basic modules $BM_1$ to $BM_J$ associated with the antenna elements. As shown, the basic modules $BM_1$ to $BM_J$ introduce different true time delays (in this example $(J-1)\Delta t$, $(J-2)\Delta t$ . . . , $\Delta t$, 0) which are introduced to the signals $SP^1_1$ to $SP^1_J$ such that the beam BFD1 is formed in the desired direction $\Theta_1$. It is noted that the super scripts in the notation of FIG. 1A are indicative of the antenna element to which the signal is directed, and the subscripts are indicative of the beam. The multibeam forming processor MBFP is adapted for operating the basic modules $BM_1$ to $BM_J$ to introduce the appropriate time delays to the signals $SP^1_1$ to $SP^1_J$, $SP^2_1$ to $SP^2_J$, . . . $SP^N_1$ to $SP^N_J$ of the respective beams. The time delays may be determined based on the desired directions of the beams $\Theta_1$, $\Theta_2$ to $\Theta_N$ by utilizing any suitable beamforming calculation and/or by utilizing a bank/data of time delay values to be introduced for forming beams in various directions.

It should be noted that according to the technique of the present invention the resolution of the time delays introduced by the basic modules is high enough and typically matches the sampling duration $T_1$ of the higher sampling rate $SR_1$ ($T_1 \sim 1/SR_1$). This provides for achieving accurate beamforming while avoiding/reducing beam-squint (e.g. inter-symbol interferences), which in turn yields frequency selective beamforming performance (the invention thereby provides for avoiding/reducing frequency selective distortions/gain).

The configuration of each of the basic modules $BM_1$ to $BM_J$ according to some embodiments of the present invention is illustrated in the figure with reference to the basic module $BM_J$. Each basic module (e.g. $BM_J$) includes first and second successive processing stages, STG1 and STG2 (also referred to herein as higher- and lower-sampling rate stages), that are respectively connected in between the first (transceiver) port $TR_J$ and the second signal ports $SP_1$ to $SP_N$ of the basic module $BM_J$. Namely the first processing stage STG1 of the basic module $BM_J$ is connected to the transceiver port $TR_J$ (being the first port that is respectively associated with the basic module $BM_J$) and the second processing STG2 of the basic module $BM_J$ is connected to the N second signal ports $SP_1$ to $SP_N$ of the basic module $BM_J$. This provides highly efficient and compact implementation of the first stage high resolution multipath time delay processor of the present invention.

The first processing stage STG1 is actually a multipath high resolution time delay processor/filter configured and operable according to various embodiments of the present invention as described for example with reference to FIGS. 1C to 1F. In this regard the multipath high resolution time delay processor/filter is configured to define a plurality of L paths for connecting in between at least a first port $TR_J$, which is operative for passing signals having high sampling rate SR1, and a plurality of L ports $PT_1$ to $PT_L$, which are operative at lower sampling rates SR1, while converting the signals in between the high and low sampling rates in introducing different time delays with resolution of the high sampling rate to the signals propagating through the different paths $PT_1$ to $PT_L$ respectively. The first type digital time delay channels are arranged in a network NT of M≥1 number of processor levels, each level operable with a certain different sampling rate. The network thereby introduces a plurality of different time delays to signals in the corresponding plurality of L network ports.

The second processing stage STG2 is operative at the lower sampling rate and includes a set/array of N signals channels DTC2 connected to the N second signal ports $SP_1$ to $SP_N$. Each signal channel DTC2 includes an adjustable time delay shifter SHT (signal sample shifter; e.g. shift register) and a phase shifter PHA. Each of the second type digital time delay channels DTC2 are operable at the second sampling rate $SR_2$ or shifting signal communicated therethrough by any number between 0 and K samples of the second sampling rate.

The L network ports of the first processing stage STG1 are connected to the N channels of the second stage STG2 via path selector multiplexer module PSM which includes a set of switches configured and operable for selectively linking between said L network ports and the N second type digital time delay channels.

It should be understood that the terms first and second here do not necessarily designate the order of the signal processing carried by these stages. For instance, in transmission mode the signals obtained from the second ports are first processed by the second stage and only then by the first stage, and vice versa in reception mode (namely in reception mode the signals obtained from the first port $TR_J$ are processed by the first and second stages successively). Accordingly, it should also be noted that the term signal splitter/combiner is used herein to designate a signal splitter module, a signal combining module or a module configured for carrying out both functions of signal splitting and combining. For instance, in transmission mode the plurality of up to L signals entering the L signals paths of the first stage STG1 of the basic module $BM_J$, are eventually combined (e.g. with different time delays introduced thereto) by the first stage to output a single signal that is provided to the respective transceiver $TR_J$ and transmitted by the corresponding antenna element $AE_J$, and vice versa in reception mode, the signal received by antenna element $AE_J$ is processed by the first stage STG1 and split to up to L signals to which different delays are introduced.

Each of the basic modules $BM_1$ to $BM_J$ is configured and operable to couple between up to N low sampling rate beam signals (which are fed into or out of the basic module through the second processing stage STG2), and a single/combined-beams signal $Sig^J$ of a higher sampling rate which is respectively fed and communicated to/from the antenna element/transceiver port. Each of the basic module $BM_1$ to $BM_J$ introduces to the N beam signals $SP^1$ to $SP^N$, up to N different time delays with a temporal resolution that matches the higher sampling rate SR1. In this regard, the second processing stage STG2 is configured and operable to introduce to the signals the parts of their required time delays which are integer multiples of the sampling duration $T_2$ of the lower sampling rate $SR_2$ ($T_2 \sim 1/SR_2$), and the first processing stage STG1 is configured and operable to introduce to the signals the parts of their required time delays which are shorter than the sampling duration $T_2$, while with high temporal resolution matching the time duration $T_1 \sim 1/SR_1$ of the higher sampling rate $SR_1$.

The first stage STG1 includes a network of first type time delay channels DTC1 arranged to define L signal paths $PT_1$ to $PT_L$ introducing different respective time delays to the signals propagating therethrough. The first type time delay channels DTC1 and/or the L signal paths $PT_1$ to $PT_L$ may be configured and operable for introducing fixed high resolution time delays that are fractions of the sampling duration $T_2 \sim 1/SR_2$ of the lower sampling rate $SR_2$. The number L of fixed time delay paths through the first stage STG1 typically equals about $L=T_2/T_1=SR_1/SR_2$ so that the first stage can introduce to the signals ($SP^1_J$ to $SP^N_J$) processed thereby any time delay in between 0 and $T_2$ with resolution $T_1$. For instance paths $PT_1$ to $PT_L$ may be configured to introduce fixed respective time delays $0, T_1, 2T_1, \ldots (L-1)T_1$.

The second processing stage STG2 includes a number N (e.g. matching the number of beams) of signal paths which are connectable/connected to the N second signal ports $SP^1_J$ to $SP^N_J$ of the basic module $BM_J$. The N of signal paths each includes a second type digital time delay channel DTC2 operable for processing a plurality of N signals $SP^1_J$ to $SP^N_J$ of the basic module $BM_J$ (corresponding to N beams to be formed) for controllably introducing thereto respectively N selected time delays of durations that are integer multiples (including zero) of the sampling duration $T_2$ of the lower sampling rate SR2. As illustrated in the figure, in the present example the second type digital time delay channel DTC2 is implemented by a shift register capable of shifting the signals propagating therethrough by any number of samples (of the lower sampling rate) between zero and K. Additionally, optionally, the second processing stage STG2 may also be configured and operable for controllably introducing desired phase compensations to the N signals. As illustrated, this may be achieved by the optional phase adjustment multiplier modules PHA located along the signal N signal paths of the second stage. The phase multiplier modules PHA may be for example adapted to multiply the digitized base band signal by a complex multiplier to thereby introduce suitable phase adjustments to baseband frequency components of the baseband signal, which are selected such that the phase of the carrier frequency in the passband signal (which corresponds to the baseband signal multiplied by the carrier frequency and is the signal transmitted/received by the antenna element $AE_J$) is shifted by an amount corresponding to the time delay introduced to the baseband signal by the adjustable time delay shifter SHT of the respective second type digital time delay channel DTC2.

Accordingly, the second stage of the basic module $BM_J$ introduces to each of the signals $SP^1_J$ to $SP^N_J$ of the N beams processed thereby, a selected time delay being an integer multiple (between 0 and K) of the lower sampling duration T2. The first stage includes L fixed paths of different delays between 0 and $(L-1)*T1$, whereby $L*T1$ may be equal to T2. Thus by coupling any of the signals $SP^1_J$ to $SP^N_J$ of the second stage STG2 to any of the L signal paths $PT_1$ to $PT_L$ of the first stage STG1, any time delay between 0 to $(K*T2+(L-1)*T1)$ can be introduced to each of the signals with the high temporal resolution T1.

Therefore, the first and second successive processing stages, STG1 and STG2, are connected to one another via a path selector multiplexer module PSM, that is configured and operable for managing signal coupling between the first and second successive processing stages. According to some embodiments of the present invention the path selector multiplexer module PSM is adapted for coupling any of the L signal paths $PT_1$ to $PT_L$ of the first stage STG1 to any of the N signals $SP^1_J$ to $SP^N_J$ (or second type time delay modules $DTC2_1$ to $DTC2_N$) of the second stage of basic module $BM_J$. The N of signal paths each includes a second type digital time delay channel DTC2. The path selector multiplexer module PSM and the second processing stage STG2 are operable for processing signals at the lower/second sampling rate $SR_2$.

Thus, in some embodiments the signal processing circuit 100 of the present invention includes at least one (and typically a plurality of) basic module(s) $BM_1$ to $BM_J$. Each basic module $BM_J$ connected between a respective first port $TR_J$ (associated with respective antenna element $AE_J$) and a plurality of second signal ports corresponding to a maximal number of beams to be processed by the basic module. Generally the number N of second ports $SP^1_J$ to $SP^N_J$ may be different for different basic modules. Accordingly, per each antenna element, the signal processing circuit includes a corresponding basic module capable of handling a plurality of signals (e.g. beam components) which are to be transmitted/received using the respective antenna element (the up to N beam components). The basic module $BM_J$ is configured such that signals at the first port $TR_J$ (e.g. associated with the respective antenna element of the basic module $BM_J$) are provided (e.g. in/out of the basic module depending upon whether the basic module is configured/operable for reception/transmission mode) with at least a first sampling rate $SR_1$ and signals at the plurality N second signal ports are provided with a certain second sampling rate $SR_2$ lower than the first sampling rate $SR_1$.

In some embodiments, the signal processing circuit 100 (e.g. the basic module(s) $BM_J$ thereof) may be configured and operable for optimizing the use of the high frequency delay channels. This is achieved by enabling re-usage/co-usage of each of such high temporal resolution delay channels for introducing the high sampling rate part of the delays to multiple beam components concurrently (accordingly, obviating a need for including, per each antenna element, a number of high temporal resolution delay channels that matches the number of components of different beams that are to be transmitted by that antenna element). More specifically this may be achieved by the following configuration of the basic module $BM_J$:

The first and second successive processing stages, STG1 and STG2, which are connected respectively to the first signal port $TR_J$ and to the second signal ports $SP^1_J$ to $SP^N_J$ are configured and operable for introducing time delays with respectively hiehr and lower temporal resolutions (SR1 and SR2 respectively), whereby the path selector multiplexer module manages the signal coupling between the L signal paths $PT_1$ to $PT_L$ of the first stage STG1 and the N time delay channels $DTC2_1$ to $DTC2_N$ of the second processing stage STG2. The L signal paths $PT_1$ to $PT_L$ of the first stage STG1 may be configured and operable for introducing L different time delays. More specifically in some embodiments each of the L paths introduces a respectively different and fixed time delay of temporal resolution higher than the second sampling rate $SR_2$ to the signal processed thereby (e.g. a certain fixed delay of temporal duration smaller than $1/SR_2$). The second type digital time delay channels $DTC2_1$ to $DTC2_N$ of the second stage may each be configured and operable for shifting a signal communicated therethrough by any number between 0 and K samples of the second sampling rate (i.e. controllably operable at the lower temporal resolution $SR_2$). In turn, the path selector multiplexer module may include a set of switches configured and operable for selectively linking any one of the L signal paths $PT_1$ to $PT_L$ of the first stage (any one of the L network ports) with any one or more of the N second type digital time delay channels $DTC2_1$ to $DTC2_N$). Accordingly by properly controlling/adjusting the gross time delays introduced by each of the N second type digital time delay channels $DTC2_1$ to $DTC2_N$ of the second stage, and by adjusting the selective linking provided by the path selector multiplexer PSM between the L signal paths $PT_1$ to $PT_L$ of the first stage and the one or more of the N second type digital time delay channels $DTC2_1$ to $DTC2_N$ of the second stage, any desired time delay with the high temporal resolution SR1 can be introduced and separately adjusted per each signal/beam-component that propagates between each of the N second signal ports $SP^1_J$ to $SP^N_J$ and the first signal port $TR_J$. Also, according to the technique of the present invention this may be achieved even with the number L of high temporal resolution (high sampling rate) signal paths $PT_1$ to $PT_L$ of the second stage being lower than the number N of beam components which are to be processed by the circuit 100. This is because in the circuit configuration of the invention these signal paths $PT_1$ to $PT_L$ can be co-used for introducing the high resolution time delays to multiple beam components concurrently, and that when configuring the L signal paths for introducing fixed respectively different time delays of the higher resolution, only about $L \cong SR_1/SR_2$ such signal paths are required. Thus, L is generally independent of the number of concurrently processed beams, and actually depend on the configuration/implementation of the circuit 100, and may be lower than N. Thus advantageously the signal processing circuit 100 of the present invention may be used/configured for beamforming of multiple beams, while reducing the required number of high resolution time delay channels (and accordingly may provide for reduction in their associated power consumption, real-estate area and/or fabrication costs. Moreover, as describe in more details below, embodiments of the invention where multi-level configuration of the first stage is implemented also provides significant simplification of the configuration and operation of each high resolution high resolution temporal delay signal path PT of the first stage.

As indicated above, the first processing stage STG1 is configured and operable for carrying out the following: (i) convert the sampling rate of the signals processed thereby in between the first (higher) sampling rate $SR_1$ of the respective transceiver port (e.g. $TR_J$) of the basic module (e.g. $BM_J$) and the second/lower sampling rate $SR_2$ at which the second processing stage STG2 and the path selector multiplexer module PSM are operating; and (ii) introduce to the signals propagating therethrough high resolution time delays $\Delta t^H$ ranging between 0 and at least $T_2-T_1$ with resolution $T_1$ For instance, each signal path $PT_1$ of the L signal paths $PT_1$ to $PT_L$ of the first stage STG1 is configured and operable for introducing a time delay $\Delta t_l^H = (l-1)*T_1$, whereby 1 is the index of the signal path out the L signal paths (e.g. the number L of signal paths is an integer of at least $T_2/T_1$). Thus the time delay introduced to a signal, processed by the first and second stages, includes the high resolution time delay $\Delta t_l^H$ which is introduced to the signal by the selected l's signal path $PT_1$ out of the l signal paths $PT_1$ to $PT_L$ of the first stage, and a low resolution time delay $\Delta t_l^L$, which is a introduced to the signal by the respective $n^{th}$ time delay channel of the second stage which is associated with the $n^{th}$ beam.

Figure 1B:
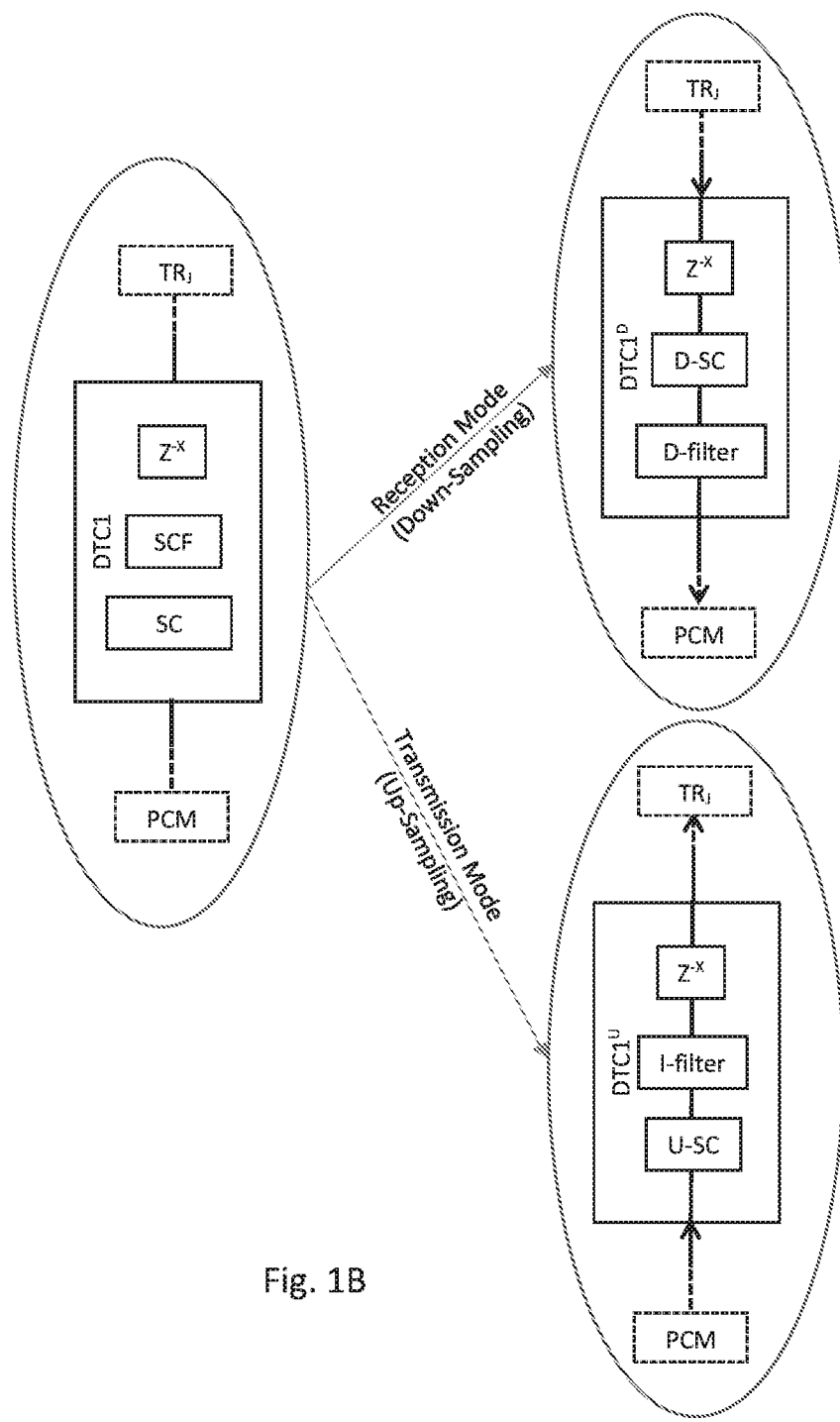

To this end, each signal path $PT_1$ of the L signal paths $PT_1$ to $PT_L$ of the first stage includes at least one first type digital time delay channel DTC1. FIG. 1B is a block diagram schematically illustrating the structure of a first type digital time delay channel DTC1 configured and operable according to some embodiments of the present invention. On the left side of FIG. 1B there is illustrated the general configuration of the first type digital time delay channels DTC1 used in the first stage STG1. As shown, the digital time delay channel DTC1 includes: a sampling convertor SC configured and operable for applying sampling rate conversion (up and/or down conversion) to the signal processed thereby; a sampling conversion filter SCF configured and operable for applying appropriate sampling rate conversion filtration (e.g. anti-aliasing filtration to the signal whose sampling rate was converted); and a sampling shifter $Z^{-X}$ configured and operable for shifting signals communicated therethrough by a certain number X of samples and thereby introducing time delay to the signal whose duration is the one over the sampling rate to which the signal has been converted. Generally the number X of samples by which the signal is shifted may be any number between 0 to S samples, whereby in the flat network configuration of the first stage STG1 exemplified example of FIG. 1C in the different L signal paths $PT_1$ to $PT_L$, X acquires different values from 0 to $S=L-1$ so that all possible delays between 0 and T2 with resolution T1 can be introduced to the signals by propagating them through different paths of $PT_1$ to $PT_L$, in the binary tree configuration of the first stage STG1 exemplified in FIG. 1E, X may be 0 or 1 (namely S=1), while also other configurations of the first stage STG1 are possible (e.g. see for instance FIG. 1F) It should be noted that some digital time delay channels DTC1 do not introduce any time delay/sampling shift (X=0). In such cases the sampling shifter $Z^{-X}$ is actually redundant and should be considered simply as a signal transmission line.

On the upper right part of the FIG. 1B there is shown the configuration of the first type digital time delay channel $DTC1^D$ configured for introducing the time delay while also down-converting the sampling rate of the signal. This configuration is used in the reception mode whereby the signal is received at high sampling rate SR1 and is down converted by the first stage to lower sampling rate SR2 which is more conveniently manageable by standard/cost-effective signal processing solutions. In this case, the signal propagating from the direction of the antenna/transceiver-port $TR_J$ with high sampling rate, is first shifted by the desired number of samples of the high sampling rate (thereby introducing high resolution time delay thereto, and thereafter its sampling rate is down converted by the sampling convertor SC, which is in this case a sampling rate down conversion module D-SC; and thereafter filtered by the sampling conversion filter SCF—being in this case a decimation filter D-Filter.

On the lower right side of the figure there is shown the configuration of the first type digital time delay channel $DTC1^U$ configured for introducing the time delay while also up converting the sampling rate of the signal. This configuration is used in the transmission mode whereby the signal which is received at low sampling rate SR2 is up converted by the first stage STG1 to higher sampling rate SR1 by which it can be accurately transmitted (after further conversion from digital to analog signal form). In this case, the sampling rate of the signal propagating from the direction of the second stage STG2 (e.g. from the path selector multiplexer module PSM) with low sampling rate, is down converted by the sampling convertor SC, which is in this case a sampling rate up conversion module U-SC, and filtered by the sampling conversion filter SCF—being in this case an interpolation filter I-Filter, and then the signal is shifted by the desired number of samples of the high sampling rate (thereby introducing high resolution time delay thereto).

As indicated above, the first processing stage includes a network NT of a plurality of first type digital time delay channels DTC1 connectable via one or more signal splitters/combiners SP/C to define L signal paths $PT_1$ to $PT_L$ of different respective time delays between the path selector multiplexer module PSM of the respective basic module (e.g. $BM_J$) and the transceiver port (e.g. $TR_J$) associated with the respective basic module (e.g. $BM_J$).

FIGS. 1C to 1F are block diagrams schematically illustrating several examples of configurations of a multipath high-resolution time delay processor/filter STG1 configured according to the present invention. The multipath high-resolution time delay processor/filter (also referred to herein for clarity simply as the first processing stage, or the first stage) includes network NT of first type digital time delay channels DTC1 configured according to several exemplifying embodiments of the present invention.

Figure 1C:
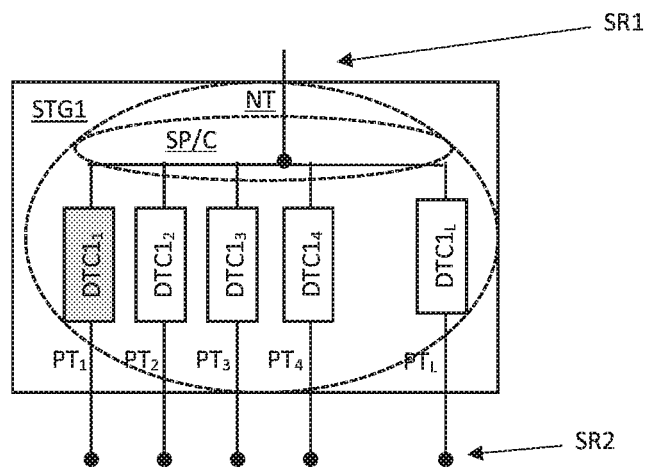

Turning now to FIG. 1C, a multipath high-resolution time delay processor/filter (first stage) STG1 including a "flat" type, single level network (M=1) is illustrated. Here M indicates the number of levels in the network NT. As shown, in this case a single signal splitter/combiner SP/C is used to connect together L signal paths whereby each signal path 1 of the L signal paths includes a first type digital time delay channel DTC1 that is adapted for up/down converting the sampling rate of the signal propagation therethrough by a factor of SR1/SR2 (whereby SR1 being the high sampling rate of the signal provided by/from the transceiver port/module, and SR2 is the lower sampling rate of the system/second stage STG2), apply sampling rate conversion filtration (to remove artifacts such as aliasing artifacts from the up/down converted signal) and also introduce a certain time delay $X^1*1/SR1$. Accordingly, this configuration provides the network of plurality of first type digital time delay channels $DTC1_1$ to $DTC1_L$) arranged in a single processing level (M=1) to introduce different respective time delays to signals propagating in the respective signal paths $PT_1$ to $PT_L$ to/from the first transceiver port (e.g. $TR_J$).

To this end, in the implementation exemplified in FIG. 1C, the sampling conversion filters (referenced in FIG. 1B in general as SCF, and specifically D-Filter and I-filter for the cases respectively of decimation (down-sampling) filters and interpolation (up-sampling) filters), are configured for filtering an up/down converted signal that had been converted by the conversion ratio/factor of SR1/SR2. Generally such sampling conversion filters (interpolation and/or decimation filters) may be implemented for example as FIR (finite impulse response) filters and/or by IIR (infinite impulse response filters) having one or more filter taps each (also referred to herein simply as taps), or any other type of suitable filters. In this regard, in some implementations FIR filters are preferable to use since such filters have linear phase response and are inherently stable (as compared for example to IIR filters). Indeed, the larger the number of taps such filter has, the better and more accurate the filtration operation thereof, resulting in reduced artifacts in the signal and therefore consequently providing improvement in the beamforming quality of the system 100. To this end, the sampling conversion filters SCF used in the system are configured with a sufficient number of taps each, in order to maintain the level of artifacts introduced in the signal below a certain threshold. In this regard, it should be noted that for the given artifact threshold, there is a non-linear dependence between the required number of taps of a sampling conversion filter SCF and conversion ratio/factor that should be handled by the filter SCF (the required number of taps increases more rapidly than the sampling conversion ratio/factor). For instance in some embodiments, a filter of two taps may be used to filter a signal whose sampling rate had been up/down converted by a sampling conversion factor of two, while however it might require a filter of 6 taps to filter a signal whose sampling rate had been up/down converted by a sampling conversion factor of 4, in order to maintain the similar level of artifacts. In this regard, it should be further noted that when considering the structure and implementation of the first type digital time delay channels DTC1, in practice the sampling rate conversion filters SCF are complex and sizable modules constituents of such channels (e.g. relative to other components of the first type digital time delay channels DTC1), and require relatively significant real-estate (e.g. as compared to the sampling rate convertors SC's and the sample shifters/time delay modules $Z^{-X}$ illustrated in FIG. 1B). This is particularly important when the system 100 is implemented on a chip or as a compact module.

Moreover, inventors of the present invention have understood that the total size and complexity of the sampling rate conversion filters SCF residing along each signal path can be substantially reduced when utilizing stepwise conversion of the sampling rate in between SR1 and SR2 by a plurality of sampling rate conversion filters each carrying out only partial conversion of the sampling rate, instead of using a single filter to convert the sampling rate in between SR1 and SR2 (e.g. in a single conversion step). This is because when utilizing the "single" filter, a filter with large number of taps that is also operable at the high sampling rate, SR1 should be used. However when employing a chain of filters (e.g. arranged in multiple levels) to carry out the stepwise conversion between SR1 to SR2, one or more of the filters in the chain may be configured and operable at sampling rates lower than SR1 (i.e. the filters of the lower levels <M in the chain). Accordingly, since in this case some of the filters operate at lower sampling rates, a substantially smaller sampling rate conversion chain is obtained along the signal path (as compared to the case a single filter is used), even if the order of total number of taps in the plurality of filters matches the total number of taps that should have been used in case of a single filter. This is because the operational frequency (sampling rate of operation) of the conversion rate filters significantly affects their size and complexity. For example converting the signal in between SR1 and SR2 utilizing a chain of two filters of 30 taps each, operating at sampling rates SR1 and (SR1−((SR1−SR2)/2)) respectively may require real-estate of area A on the chip, whereby using a single filter of 60 taps operating at sampling rates SR1 may require real-estate of area 2A on the chip and may also impose timing constraints to ensure the filtering computations can be completed before next set of inputs arrive. Therefore in order to obtain a compact implementation of the system 100, it may be preferable to utilize sampling rate conversion filters of a small number of taps while achieving the level of artifacts below the artifact threshold. Thus, in some embodiments, the present invention exploits the fact that the time delays to be introduced along each signal path can be introduced in several steps of different time resolutions, and accordingly in some embodiments the time delay network of the $1^{st}$ stage STG1, is divided into multiple levels operations at different sampling rates, while the stepwise sampling rate conversions are performed in between the levels to thereby reduce the size and complexity of the sampling rate filters used along each signal path.

This is achieved according to some embodiments of the present invention by configuring the first stage time delay network NT as a multilevel time-delay network including a plurality of m levels each operative at a different sampling rate between SR1 and SR2 (inclusive). Various examples of multipath high-resolution time delay processor/filter (first stage) STG1 including such multilevel networks NT are illustrated in FIGS. 1D to 1F and described in more detail in the following.

In general, in the multilevel implementations of the first stage, the number M of the processing levels is higher than 1. The first type digital time delay channels $DTC_{m,l}$ are arranged in the cascade of levels, whereby in the FIGS. 1D to 1F the first subscript index m indicates the level index and runs from 1 to the number of levels M, and the second index l is indicative of the signal path (one of $PT_1$ to $PT_L$) along which the first type digital time delay channels $DTC_{m,l}$ resides (l runs from 1 to L at least for the first level m=1). In such multilevel implementations, the first type time delay channels $DTC_{m,l}$ of a lower level in the cascade operate at lower sampling rate (indicated here $SR_m$) than the first type digital time delay channels of a higher level $DTC_{m+1,l}$ in the cascade. For instance, a first type digital time delay channel $DTC_{m,l}$ of level m is configured and operable for: (i) shifting the signals processed thereby by a certain number X of samples (X being zero or above) of the sampling rate $SR_m$ thereof (thereby introducing time delay with resolution $1/SR_m$ to the signal); (ii) up/down converting the sampling rate of the signal to/from its operational sampling rate $SR_m$ to the operational sampling rate (e.g. $SR_{m-1}$ or $SR_{m+1}$) of the level that is next in the cascade with respect to the direction of signal propagation through the first stage STG1; and apply appropriate sampling rate conversion filtration to the signal. It should be understood that the order in which the shifting (time delay) of the signal, the sampling rate conversion and the filtration are performed by the first type digital time delay channel $DTC_{m,l}$ is a matter of design and may vary from implementation to implementation. In this regard, the operational sampling rate $SR_m$ of a first type digital time delay channel $DTC_{m,l}$ is considered here as the sampling rate by which the signal is shifted.

Accordingly, such multilevel configurations provide efficient implementations for introducing high resolution time delays to the signals (higher than the sampling rate SR2) while relaxing/obviating a need for utilizing complex sampling conversion filters SCF (sizable and/or costly to produce filters) with many taps. This is because using the multilevel cascade approach, the time delays and sampling rate conversion operations are divided and arranged in an interlaced fashion in the plurality of levels, whereby in each level m, only a small step of sampling rate conversion is performed, requiring relatively simple sampling rate conversion filters having a small number of taps.

Figure 1D:
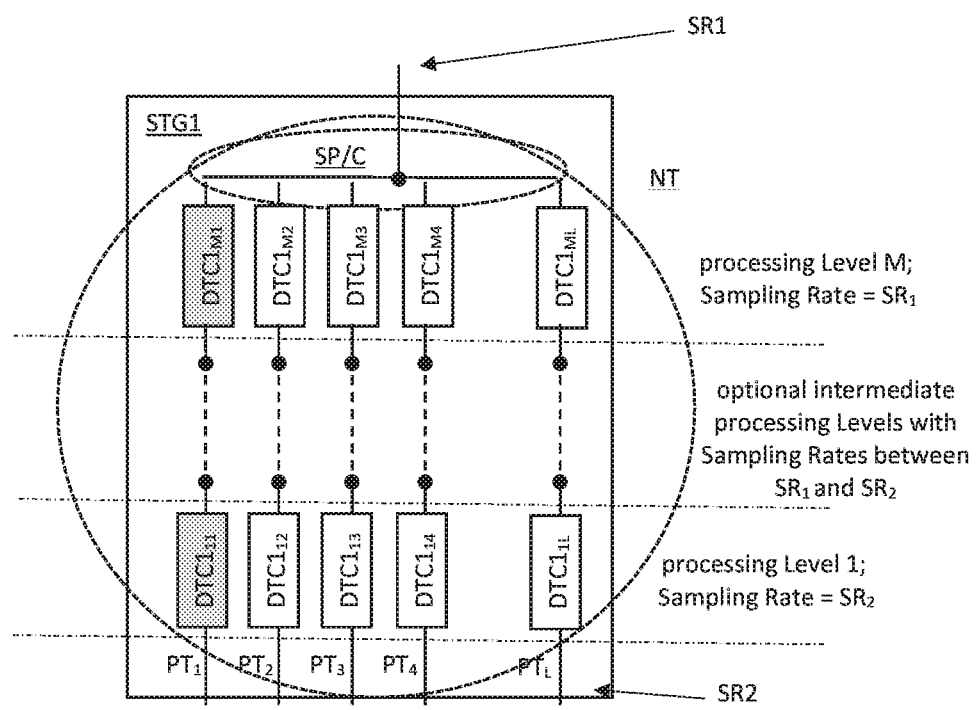
Figure 1E:
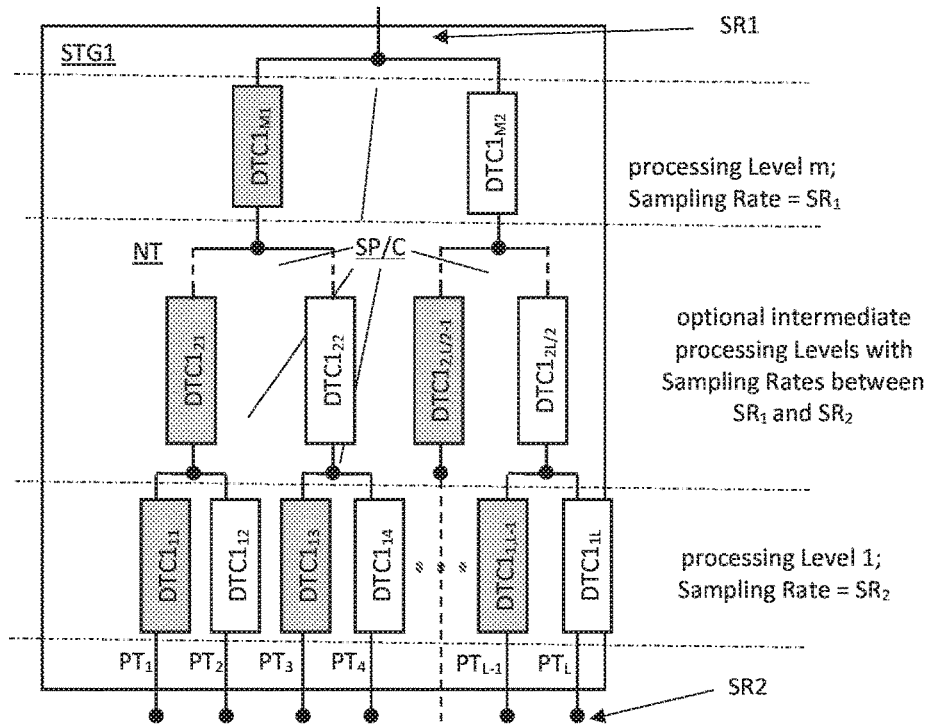
Figure 1F:
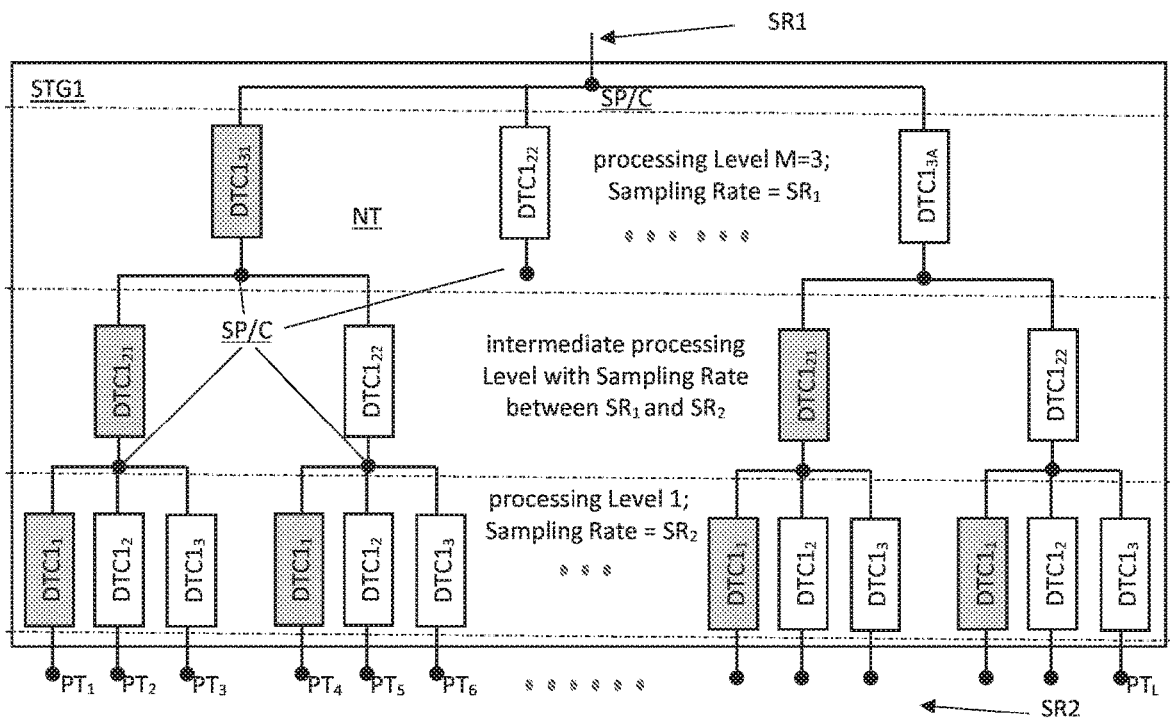

This can be readily appreciated by considering the multilevel network configuration NT of the multipath high-resolution time delay processor/filter (first stage) STG1 exemplified in FIG. 1D as compared to the single level network configuration NT of the first stage STG1 exemplified in FIG. 1C. FIG. 1D illustrates a first stage processing STG1 according to an embodiment of the present invention including a "flat" type, multilevel network (M>1 levels) network of first type digital time delay channel $DTC_{m,l}$. As shown, along each signal path $PT_1$ to $PT_L$ at least two first type digital time delay channels $DTC_{m,l}$ are arranged in a cascade in at least two levels (1 and M). As indicated in the figure, optionally more than two levels are included in the network NT. The first type digital time delay channels of the lower level m=1 operate for time delaying the signals processed thereby with a time resolution higher than the low sampling rate SR2 and lower than the high sampling rate SR1, and the first type digital time delay channels of the higher level m=M operate for time delaying the signals processed thereby with time resolution T1 of the high sampling rate SR1. The operations of sampling rate conversion (up and/or down conversion) between the high and low sampling rates, SR1 and SR2, and corresponding sampling conversion filtrations, are divided between the plurality of levels M and are interlaced with the time delay operations in the different levels. To this end, as compared to the implementation of FIG. 1C, in which the sampling rate conversion between the high and low sampling rates SR1 and SR2 and the corresponding filtration are performed in a single level/step, here, in the embodiment of FIG. 1D, much simpler sampling conversion filters can be used, facilitating highly compact and efficient implementation of high resolution multipath time delay signal processing network NT.

For example, considering the case the ratio SR1/SR2 between the high and low sampling rates is 4 (SR1/SR2=4), in the implementation of FIG. 1C at least 4 signal paths L=4 should be included in order to allow all possible time delays with resolution T1 (T1=1/SR1) between zero and T2 (T2=1/SR2). For example four first type digital time delay channel $DTC_1$, $DTC_2$, $DTC_3$, $DTC_4$ may be arranged along the respective paths $PT_1$, $PT_2$, $PT_3$, $PT_4$ and configured for introducing time delays 0, $T_1$, 2*T1, 3*T1 respectively. In this case, when utilizing the single level embodiment of FIG. 1C, except for introducing the respective time delays, each $DTC_{m,l}$ is configured to convert the sampling rate of the signal processed thereby by a factor $SR_1/SR_{2=4}$ (in between $SR_1$ and $SR_2$). To achieve this, the first type digital time delay channels should include an appropriate sampling rate conversion module SC and sampling rate conversion filters SCF. However, for providing acceptable level of artifacts subject to interference and jammer requirements for particular communication systems, sampling rate conversion filters with several taps may be required. For instance, for Transmit mode of operation, the sampling filter requirements (number of taps, sampling rate etc.) are driven by rejection requirements for the up sampled signal image, as well as out of signal band emission requirements defined by different technology standards to regulate system-wide interference. To this end, considering the embodiment of FIG. 1C, the properties of the conversion rate filters required in the multi beam signal processing circuit/system 100, (particularly in cases where the system is designed for data communication, such as satellite communication) may require use of filters having a large number of taps operating at relatively sampling rates. Such conversion rate filters may be in-turn sizable and costly to produce.

Thus according to some embodiments of the invention, in order to overcome this and obtain a compact system (having relatively compact conversion rate filters) with moderate production costs, the configuration of FIG. 1D may be considered. For instance, a similar functionality may be achieved by the multilevel first stage network configuration NT of FIG. 1D with as few as two levels (M=2), with significantly reduced complexity and size of the sampling conversion filters SCF. Assuming only two levels 1 and M=2, the first type digital time delay channels $DTC1_{1,1}$-$DTC1_{1,L=4}$ of the $1^{st}$ level may operate at a sampling rate 2*SR2 (==SR1/2) to introduce time delays that are integer (including zero) multiples of T2/2, and the first type digital time delay channels $DTC1_{2,1}$-$DTC1_{2,L=4}$ of the $2^{nd}$ level may operate at the high sampling rate SR1 (==4*SR2) to introduce time delays that are integer (including zero) multiples of T1. Accordingly, the first type digital time delay channels of the $1^{st}$ level are adapted for converting the sampling rate of the signals processed thereby in between SR2 and 2*SR2, and the first type digital time delay channels of the $2^{nd}$ level are adapted for converting the sampling rate of the signals processed thereby in between 2*SR2 and 4*SR2==SR1 (up/down conversion is performed depending on the operational mode/configuration of the system being reception mode (down-conversion) or transmission mode (up-conversion)). To this end, as compared to the previous example of FIG. 1C, in this example each first type digital time delay channel needs only to convert the sampling rate of the signal by a factor of 2 (and not a factor of 4). This requires much simpler and smaller sampling conversion filters SCF with a much reduced number of taps. Indeed, in such implementation of FIG. 1D, along each signal path $PT_1$ to $PT_4$ arranged are two first type digital time delay channels and thus two sampling conversion filters SCF. However, two sampling conversion filters SCF configured for handling sampling rate conversion of factor two are still much more efficient, cost-effective, and/or smaller than a single sampling conversion filter SCF configured for handling sampling rate conversion of factor four, such as that required in the above exemplified implementation of FIG. 1C. For instance, in order to achieve the similar level of artifacts in the former example of FIG. 1C, a factor 4 sampling conversion filter SCF with over 60 taps operating at a relatively high sampling rate might be required along each signal path (this sizable filter occupies significant proportion of the on-chip area), while in the latter example of FIG. 1D, two factor 2 sampling conversion filters SCF with 30 taps each, operating at the high sampling rate and a lower sampling rate, might be required along each signal path. In this example, these two smaller (30 taps) filters with the respectively higher and lower sampling rates can save/reduce the required on-chip area for the filters, for example by 50% or more as compared to a single 60 tap filter.

To this end, the multilevel configuration of the first stage, such as that illustrated in FIGS. 1D to 1F, may be advantageously used in various implementations of the system 100, particularly in implementations in which relatively high, e.g. 4, 8, 16 or more, sampling rate conversion factors are required between the higher and lower sampling rates, SR1 and SR2.

Turning now together to FIGS. 1E and 1F, two embodiments of the multipath high-resolution time delay processor/filter (first stage) STG1 which are configured according to the present invention as a multi-level network of time delay channels, are illustrated. In these embodiments a cascade arrangement of the first type time delay channels DTC1 arranged in a tree topology of multiple levels M>1 are illustrated. The tree topology network NT defines the L signal paths $PT_1$ to $PT_L$ between the first transceiver port $TR_J$ and the L network ports of the network NT. In this case, one or more (generally a plurality of) signal splitters/combiners are connected to the first type digital time delay channels DTC1 of the network NT and arranged to define the tree topology. The tree topology configuration of the network provides for reusing/co-using the time delay channels DTC1 of the higher levels (m>1) for commonly processing the signals of several signal paths together to introduce to the signals commonly processed by each time delay channel DTC1 a required time delay (sample shift with the sampling resolution of the corresponding level), commonly up/down convert the sampling rate of the commonly processed signals, and also commonly apply thereto the required sampling conversion filtration. As a result of the co-usage of time delay channels DTC1 of higher levels for co-processing signals associated with different signal paths, the required number of time delay channels DTC1 is reduced (e.g. as compared for example to the multilevel flat network configuration of FIG. 1D, and also the total number of taps (summed over all the filters of the time delay channels DTC1 in the network) is further reduced as compared for example to the implementation of FIGS. 1C and 1D. This provides highly efficient and compact implementation of the first stage high resolution multipath time delay processor of the present invention.

It should be noted that generally the tree topology of the multipath high-resolution time delay processor/filter (first stage) STG1 may be of any tree-degree D≥2, (whereby tree degree of D=2 indicates a binary tree topology such as that illustrated in FIG. 1E), and topologies of higher degrees D>2 indicate a higher number of branches per node), or even a tree topology of mixed degrees (as illustrated for example in FIG. 1E whereby different nodes may have a different number of branches). The tree nodes are generally implemented by signal splitters (for reception mode/operation), and/or signal combiners (for transmission mode operation) generally referenced SP/C in the figures. Each branch includes a first type time delay channel as exemplified in FIG. 1B which is configured to resample (up/down convert the sampling rate) the signal processed thereby to modify the sampling rate of the respective signal by a factor of D, and possibly time/sample shift the signal processed thereby by a predetermined integer number of samples. For a given sampling rate conversion ratio $SR_1/SR_2$ of the first stage (between the first sampling rate $SR_1$ and the second sampling rate $SR_2$) the required number of the tree levels M is generally as $M=\log_D(SR_1/SR_2)$.

Referring specifically to FIG. 1E the multipath high-resolution time delay processor/filter (first stage) STG1 is implemented in this example with a binary tree topology. Each of the first type digital time delay channels DTC1 is configured and operable for shifting signals communicated therethrough by either 0 or 1 samples of the sampling rate of the respective level m at which the respective resides. The sample rated convection module SC of each first type digital time delay channel DTC1 is configured for resampling the signal processed thereby such as to modify the sampling rate of the respective signal by a factor of 2. Accordingly, only a "small"/simple sampling conversion filter SCF is required/ included in each first type digital time delay channel DTC1. The number M of the levels in such binary tree topology is M=log 2 ($SR_1/SR_2$).

Indeed, in terms of simplicity and size of the sampling conversion filters, it is often advantageous to implement the multipath high-resolution time delay processor/filter (first stage) STG1 by utilizing the binary tree topology. Nonetheless, in some embodiments of the invention the multipath high-resolution time delay processor/filter (first stage) STG1 is implemented in flat configuration (single or multilevel) as illustrated for instance in FIGS. 1C and 1D, and/or in non-binary tree configuration, such as illustrated for example in FIG. 1F. The "flat" configuration may be advantageous for instance in cases where high resolution of delay correction can be achieved close to final oversampling ratio of the output signal with no, or only a small number of, intermediate decimation/interpolation stages between high resolution and low resolution correction stages. The "non-binary" tree configuration may be advantageous for instance in cases where very high resolution delay correction is required for the beams and there are intermediate decimation/interpolation stages.

Thus, turning back to FIG. 1A, the number N of the second type digital time delay channels corresponds to a maximal number of beam components to be received or transmitted through respective N paths of each of the basic modules multibeam signal processing circuit/system 100 to form together multibeam operation mode of the plurality of antenna elements $AE_1$ to $AE_J$. The beamforming processor MBFP is adapted for receiving input data indicative of directionalities $\Theta_1$ to $\Theta_N$ of multiple beams (up to N beams) to be produced by the multi beam signal processing circuit MBFP, and determine, based on the input data, time delays to be introduced by the N paths of each of the basic blocks, in order to form the multiple beams in the desired directions $\Theta_1$ to $\Theta_N$.

Figure 2:
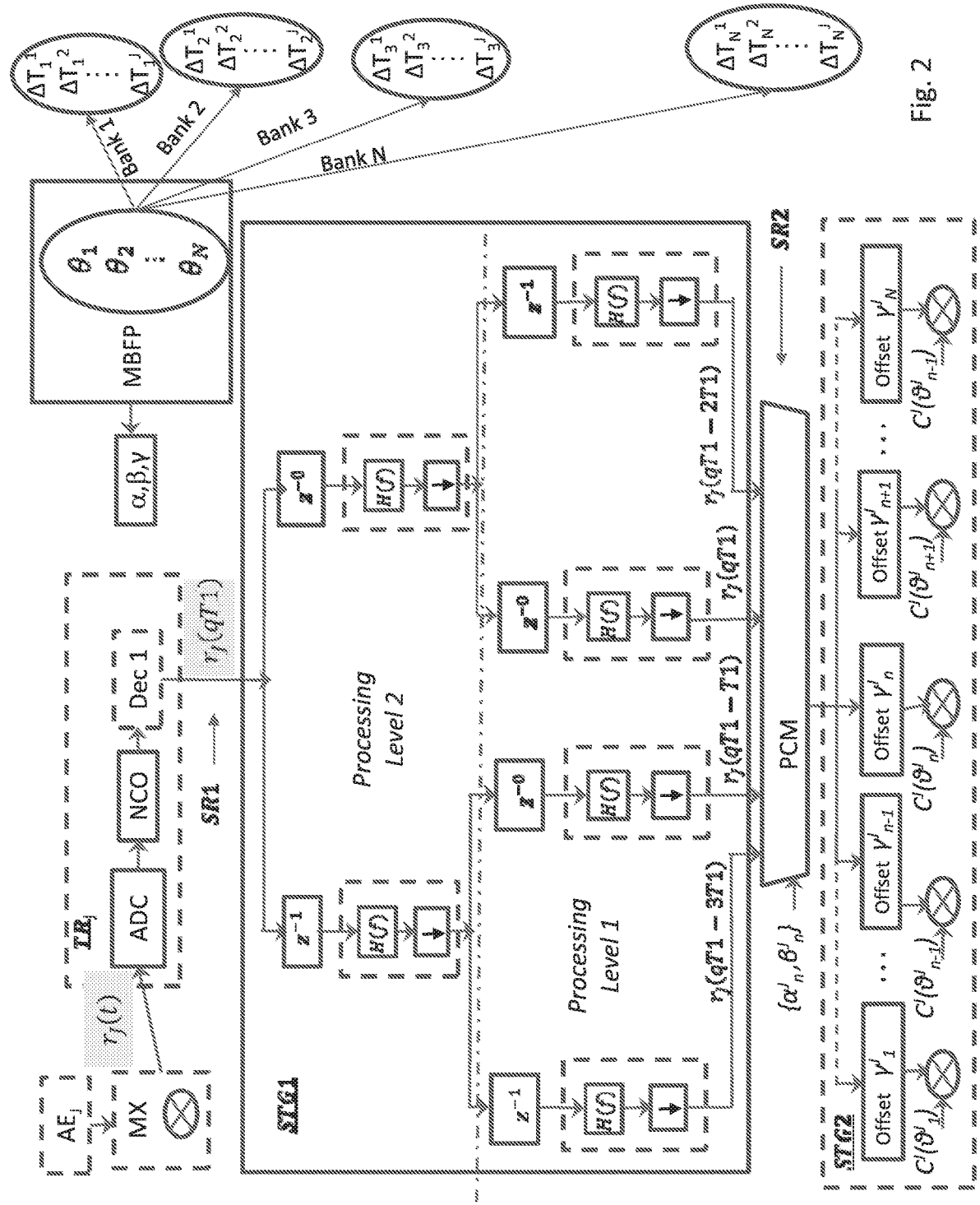
FIGS. 2 and 3 are specific, non-limiting examples of the configuration of the system of the invention for antenna operation in the receiving and transmitting modes, respectively.
Figure 3:
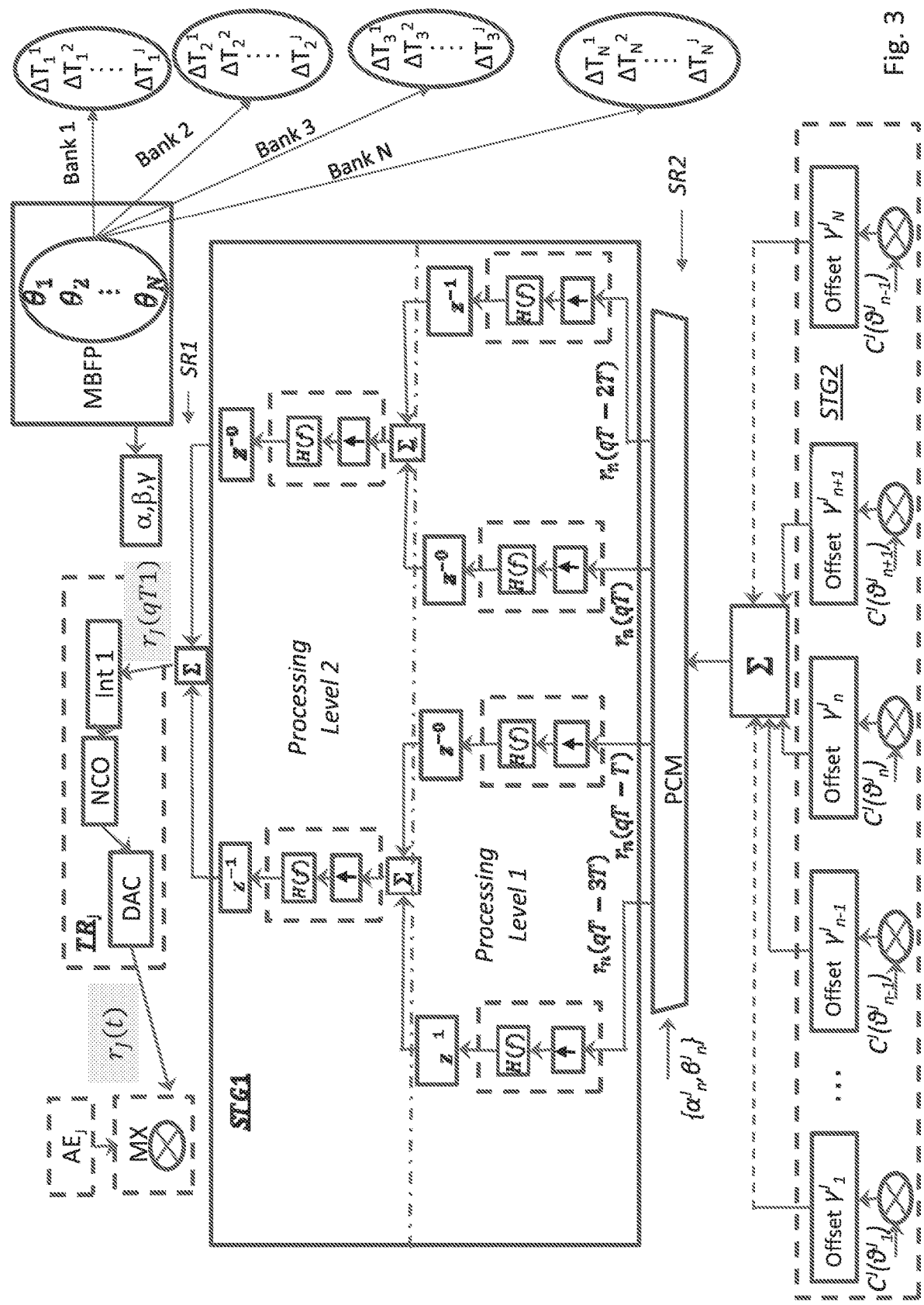

Reference is made together to FIGS. 2 and 3 which are block diagrams illustrating, in a self-explanatory manner, the system 100 according to some embodiments of the present invention adapted for operating in reception mode/ configuration and transmission mode configuration, respectively. In both these specific non-limiting examples the 1St stage STG1 of the MDTTDN basic modules $BM_J$ is implemented in a binary tree topology, which is similar to that illustrated in FIG. 1E.

In the following, detailed explanation of the operation of the system is provided with particular consideration of the reception mode operation/configuration shown in FIG. 2. However, operation of the system in transmission mode is generally similar, only with the signals being processed by the system in the opposite direction while interchanging the decimation operations with interpolation operations, and interchanging the down-sampling of the signal with up-sampling of the signal, and so forth. Therefore, a person of ordinary skill in the art will readily appreciate the operation/ configuration of the system in transmission mode shown in FIG. 3 is based on the following detailed description of operation of the system illustrated in FIG. 2 for reception mode operation. In this regard, like elements whose operation is similar or opposite in reception and transmission configurations, are marked by similar reference numerals in FIGS. 2 and 3.

In reception mode, FIG. 2, each of the MDTTDN basic modules $BM_J$ of the system 100 processes an input signal $r_J(t)$ received (e.g. from antenna element $AE_J$) through its respective transceiver port $TR_J$ (whereby t is time). In this example the transceiver port applies preprocessing of the received signal before it is further processed by the multi-beam digital time delay network (MDTTDN) $BM_J$. For instance, in this example the received signal $r_J(t)$ is an analog signal and the transceiver port $TR_J$ includes an analog to digital converter ADC and possibly a numerically controlled oscillator NCO, and optionally also a decimator module. The numerically controlled oscillator NCO typically provides for fine tuning the frequency of the transceiver to the middle of the desired signal channel, and the digital converter ADC converts the received signals to a digital form with relatively high sampling rate SR1 (e.g. for converting the received analog signal into a digital (i.e. sampled) signal having very high sampling rate $SR^H$ which is higher than the high sampling rate SR1 of the $1^{st}$ stage). The decimator is adapted for down-sampling the signal from very high sampling rate $SR^H$ to a lower sampling rate, being the high sampling rate $SR_1$ of the $1^{st}$ stage. —To this end, in some embodiments the Analog to Digital conversion of signal (e.g. by the ADC in reception mode, and vice versa the digital to analog convention by the DAC in transmission mode (see FIG. 3)) are generally configured to operate at very high sampling rates (i.e. higher than the highest sampling rate SR1 of the $1^{st}$ stage. This is in order to take advantage of oversampling of the signal in order to increase the dynamic range of the ADC (similarly for DAC in transmission) and thereby reject interference/jammers and decrease quantization noise.

Thus as described above, for case of reception, the digitized oversampled signal is then filtered and down-sampled by the decimation module of the transceiver to reject aliases (or vice versa for the case of transmission, FIG. 3, up-sampled by the interpolation module of the transceiver).

To this end, for a signal that is subject to adjacent channel jammer or interference requirements, a very high order Finite Impulse Response filter (which has linear phase) with sharp response is often needed in the decimation module (or in the interpolation module in transmission mode) in order to directly down-sample (or up-sample in transmission) the signal to an oversample ratio of 2. Such a filter is very costly with respect to area and power, especially for ADCs/DACs operating at very high sampling rates $SR^H$ (e.g. hundreds of MHz and above). Therefore, in such cases a multi-rate filter bank can be used in the decimation module of FIG. 2 and/or in the interpolation module of FIG. 3) in order to successfully achieve the alias rejection with a set of small low order filters operating at different intermediate sampling rates. This may provide for saving both power and area. The design constraints for these sub-filters operating at intermediate sampling rates are lower compared to a single decimation filter operating at ADC sampling rate. If the number of decimation (or interpolation) stages can be expressed as power of 2, then implementation of half-band filters can further help improve the efficiency It should be noted that according to various embodiments of the present invention the basic module(s) BW are implemented as digital true time delay networks that operate on the signal's baseband. Operating in the baseband frequency may be preferable since the baseband frequency is significantly lower than the carriers frequency band and therefore it introduces the appropriate time delays and phase shifts in the baseband and is readily applicable with lower sampling rates and with much simpler and smaller electronics. To this end, the transceiver module $TR^J$ connecting the basic module(s) $BM_J$ to its respective antenna element $AE^J$ may include a signal mixer MX configured and operable for mixing the baseband signal with the carrier frequency so as to convert the signal from the carrier's signal frequency band by which it is transmitted/received by the antenna element, to the baseband frequency by which it is processed and beamformed by true time delay networks of the basic modules.

Thus the transceiver module of the system of FIG. 2 provides for converting the received signal into a digital form $r_J(q*T1)$ (whereby q is the sample index and T1 is the sampling time (T1=1/SR1) and is then provided to the first stage STG1 of the basic module $BM_J$, by which it is processed in a similar way as described with reference to FIGS. 1A to 1F above for producing/outputting L differently time delayed replicas of the digital form of the received signal $r_J(q*T1)$ but with lower sampling rate SR2. It should be noted that here the sampling rate conversion module, being down converter (SC in FIGS. 1A to 1F), is marked by the down pointing arrow, the sampling rate conversion filter, being decimation filter (SCF in FIGS. 1A to 1F) is marked by H(f), and the signal sampling shifters are marked by $Z^{-0}$ and $Z^{-1}$ for indicating respective shifters for shifting the signals processed thereby by 0 or 1 samples.

The differently time delayed replicas of the digital form of the received signal $r_J(q*T1)$ are delayed relative to one another by different respective time delays with a delay resolution of T1. In the present example, the high sampling rate SR1 is four times the lower sampling rate SR2 (SR1=4*SR2), and accordingly four (L=4) signal replicas are output from the first stage STG1 with respective delays 0, T1, 2*T1 and 3*T1, as shown in the figure. The path selector multiplexer module PSM is operated to selectively link the differently time delayed digital replicas of the received signal $r_J(q*T1)$ that are output from the first stage STG1, to one or more of the beam signal channels/paths of the second stage STG2. In this regard, operational parameters $\{\alpha^J_m$ and $\beta^J_m\}$ indicative of the directions $\{\theta\}$ of the beams that are to be received are used to control/adjust which of the L signal paths of the first stage is linked to which of the N beam channels/paths of the second stage (where J is the index of the antenna element and n is the beam index. $\alpha$ and $\beta$ represent control parameters for selecting particular path through the first stage STG1, to appropriately delay the signal of beam n directed to the $j^{th}$ antenna element $AE^j$j. In this example $\alpha^J_n$ and $\beta^J_n$ represent the control parameters selecting the signal path $PT_1$ the signal of the beam n and antenna element J should take through the $1^{st}$ stage in order to obtain the appropriate high resolution time delay (whereby here $\alpha$ represents path selection at the level of the high sampling rate in stage 1 (level 2) and $\beta$ represents selection at the level of the lower sampling rate in stage 1 (level 1); in case of additional levels, there may be an additional equivalent number of more control parameters in stage 1, or a single parameter representing the entire path selection through the stage). $\gamma^J_m$ is the control parameter representing the low sampling rate time delay that is to be inserted to the signal of beam n and antenna element J by the second stage STG2.

The N beam channels $\{\gamma^J_N\}$ of the second stage STG2 are configured as/include adjustable signal sampling shifters, $\gamma^J_N$ where $\gamma^J_N$ (referenced SHT in FIGS. 1A to 1F), operable to shift/delay the signals by an integer number of samples $\gamma^J_N$ of the lower sampling rate. These adjustable signal sampling shifters operate using a predetermined control parameter provided from the multiple beam former processor MBFP in accordance with the directions $\{\theta\}$ to which the beam should be formed.

As also shown in the figure, in order to implement the true time delay, the N beam channels of the second stage STG2 also include N signal multipliers associated with the respective shifters, $\gamma^J_N$ where $\gamma^J_N$, and configured and operable for multiplying the N base band signals that are being processed by the system 100 by a phase compensating signal $C^J(\theta_n)$ such that eventually the carrier's phase in the band pass signal is properly adjusted in line with the time delay applied to the signal. Thus, additional control parameters $C^J(\theta_n)$ that are provided to the second stage STG2, pertain to the phase shifts that should be introduced to the baseband signal in order to introduce the appropriate phase shift in the carrier's frequency.

To this end, the multi-beamforming processor provides data indicative of the control parameters $\alpha$, $\beta$, $\gamma$ and C to the first and second stages in order to introduce the appropriate true time delay to the signals processed by the basic modules of the different antenna elements so as to beam-form the signals being received/transmitted by the plurality of antenna elements. In this example of FIGS. 2 and 3, the MBFP utilizes reference data Bank 1, . . . Bank N, to determine the control parameters $\alpha$, $\beta$, $\gamma$ that are used for adjusting the operation of the path selector multiplexer PSM and the second processing stage STG2 in order to form the beams in the required directions $\{\theta\}$. E.g. each bank n of the banks Bank 1 to Bank N may store data indicative of the time delays $\{\Delta T_n^1$ to $\Delta T_n^J\}$ which should be introduced to the signals of the $n^{th}$ beam received/transmitted by the respective antennas 1 to J in order to form the $n^{th}$ beam. Based on this data the $\alpha$, $\beta$, $\gamma$ parameters may be determined. Indeed alternatively, instead of the banks, the time delays $\{\Delta T_n^1$ to $\Delta T_n^J\}$ and/or the $\alpha$, $\beta$, $\gamma$ parameters may be calculated/determined by processing based on the angle $\theta^n$ of the $n^{th}$ beam and the arrangement of the J antennas.

It should be understood, although not specifically shown here, that the output of the N beam channels of the second stage STG2 are directed out via ports $SP_1$ to $SP_N$ shown in FIG. 1A.

As shown in FIG. 3 in a self-explanatory manner, in the transmission mode/configuration, each of the basic modules $BM_J$ of the system 100 processes a plurality of N input signals received respectively through the N second signal ports of the second stage (ports $SP_1$ to $SP_N$ shown in FIG. 1A) and outputs a combined output signal via the first transceiver port $TR_J$. The combined output signal is formed as a combination of the N input signals with predetermined time delays between them which are introduced by the first and second processing stages. In this case, the flow of the signals through the processing stage is in the opposite direction, as compared to the system operation in the receiving mode described above. Also, in the transmission mode the initial stage is the second stage operating at the lower sampling rate SR2, and the successive stage being the first stage is configured to up-convert the sampling rate of the signal from SR2 to SR1. Accordingly, in this case, the first stage includes up-conversion modules, marked in the figure by arrows pointing up (SC in FIGS. 1A to 1F) and resampling interpolation filters H(f) configured and operable for carrying out sampling rate conversion filtration to increase the sampling rate of the signal. Also in this case (transmission) the one or more signal splitter/combiners SP/C include at least a signal combiner.

The invention claimed is:

1. A signal processing circuit for forming multiple beams, the signal processing circuit comprising:
   a plurality of basic modules associated with a respective plurality of antenna elements;
   each basic module of the basic modules being configured for connection in between a first port associated with a respective one of the antenna elements and a plurality of N second signal ports; and wherein signals at said first port are provided with at least a first sampling rate $SR_1$ and signals at said plurality of N second signal ports are provided with a second sampling rate $SR_2$ lower than said first sampling rate $SR_1$, such that $SR_2 < SR_1$;
   said basic module comprising: first and second successive processing stages connected respectively to the first signal port and to the N second signal ports, and operative for introducing time delays with respective temporal resolutions of said first and second sampling rates, $SR_1$ and $SR_2$, and a path selector multiplexer module for managing signal coupling between the first and second successive processing stages, wherein:
   (i) the first processing stage comprises a network of first type digital time delay channels connectable via one or more signal splitters/combiners to define L signal paths through the network capable of introducing L different time delays of temporal resolution higher than said second sampling rate $SR_2$;
   (ii) the second processing stage comprises an array of N second type digital time delay channels connected to said N second signal ports, respectively, and each of the second type digital time delay channels being operable at the second sampling rate $SR_2$ for shifting a signal communicated therethrough by any number between 0 and K samples of the second sampling rate; and
   (iii) the path selector multiplexer module comprises a set of switches configured and operable for selectively linking any one of said L signal paths with any one or more of said N second type digital time delay channels.

2. The multi beam signal processing circuit according to claim 1, wherein the number N of the second type digital time delay channels corresponds to a maximal number of beam components to be received or transmitted through respective N paths of each of the basic modules, to form together multi beam operation mode of the plurality of antenna elements.

3. The multi beam signal processing circuit according to claim 2, further comprising a beam forming processor adapted for receiving input data indicative of directionality of multiple beams to be produced by the multi beam signal processing circuit, said beam forming processor being configured to determine, based on said input data, time delays to be introduced by said N paths in each of the basic blocks to form said multiple beams.

4. The multi beam signal processing circuit according to claim 1, wherein the said L signal paths are about $L \cong SR_1/SR_2$ signal paths adapted for introducing said L different time delays as fixed time delays; and each of the second type digital time delay channels being configured as an adjustable signal sampling shifter operable at the second sampling rate.

5. The multi beam signal processing circuit according to claim 1, wherein the first type digital time delay channels being arranged in M >1 processing levels, and wherein the first type digital time delay channels of each level are operable with a certain different sampling rate.

6. The multi beam signal processing circuit according to claim 5, such that each of the first type digital time delay channels is configured and operable for shifting signals communicated therethrough by a certain number from 0 to S samples of the sampling rate of the respective level and applying sampling rate conversion filtration to the signal, for converting a sampling rate of said signal in between said sampling rate of the respective level and a predetermined different sampling rate.

7. The multi-beam signal processing circuit according to claim 5, wherein the first type digital time delay channels are arranged in a cascade in which the first type time delay channels of a lower level in the cascade operate at lower sampling rate than the first type digital time delay channels of a higher level in the cascade.

8. The multi beam signal processing circuit according to claim 7, wherein the cascade arrangement has a tree topology defining said L paths between the first port and L ports of said network, thereby reducing a total number of taps required for the decimation filtration.

9. The multi beam signal processing circuit according to claim 8, wherein said one or more signal splitters/combiners are connected to said first type digital time delay channels and arranged to define said tree topology.

10. The multi beam signal processing circuit according to claim 8, wherein said tree topology is a tree-degree D, where D>2, said resampling being configured to modify the sampling rate of the respective signal by a factor of D, and said number M of the levels is determined as $\log_D$ of a ratio between the first sampling rate $SR_1$ and the second sampling rate $SR_2$.

11. The multi beam signal processing circuit according to claim 8, wherein tree topology is a binary tree, and each of the first type digital time delay channels is configured and operable for shifting signals communicated therethrough by either 0 or 1 samples of the sampling rate of the respective level.

12. The multi beam signal processing circuit according to claim 11, wherein said resampling is configured to modify the sampling rate of the respective signal by a factor of 2, and said number M of the levels is determined as log 2 of a ratio between the first sampling rate $SR_1$ and the second sampling rate $SR_2$.

13. The multi beam signal processing circuit according to claim 1 configured and operable in reception mode for processing an input signal received through said first port and output plurality of N output signals via said N second signal ports respectively, whereby said N output signals are similar signals delayed with respect to one another by predetermined time delays introduced via said first and second processing stages.

14. The multi beam signal processing circuit according to claim 13, wherein each of said first type digital time delay channel comprises a sampling rate down converter and a decimation filter adapted for carrying out said sampling rate conversion filtration to reduce the sampling rate of said signal; and wherein each of said one or more signal splitter/combiners includes at least a signal splitter.

15. The multi beam signal processing circuit according to claim 1, configured and operable in transmission mode for processing a plurality of N input signals received through said N second signal ports respectively, to output a combined output signal via said first port, whereby said combined output signal is formed as a combination of N input signals with predetermined time delays between them introduced via said first and second processing stages.

16. The multi beam signal processing circuit according to claim 15, wherein each of said first type digital time delay channel comprises a sampling rate up converter and a resampling interpolation filter for carrying out said sampling rate conversion filtration to increase the sampling rate of said signal; and wherein each of said one or more signal splitter/combiners includes at least a signal combiner.

17. The multi beam signal processing circuit according to claim 1, wherein each second signal port of said N second signal ports comprises a complex weight multiplier adapted for multiplying the signal communicated via said second signal port by an input complex weight factor for adjusting the phase of the communicated signal.

18. The multi beam signal processing circuit according to claim 1, wherein the first signal port comprises one or more of the following:
   a. a digital to analog converter (DAC) or analog to digital converter (ADC);
   b. a numerically controlled oscillator; and
   c. a global sampling rate conversion module.

19. A chip carrying the multi beam signal processing circuit according to claim 1.

20. An antenna device comprising: a plurality of antenna elements operable in a multi-beam mode; and the multi beam signal processing circuit of any claim 1.

21. A multipath time delay filter comprising at least a first processing stage configured to define a plurality of L paths for connecting in between at least a first signal port, operative at a high sampling rate $SR_1$, and a plurality of L network ports operative at lower sampling rates, whereby said plurality of L paths are configured and operable for converting the signals' sampling rate between the high sampling rate SR1 of the first port and the lower sampling rate of the L network ports and respectively introducing to the signals passing through the L paths, different time delays with resolution of the high sampling rate SR1.

22. The multipath time delay filter of claim 21, wherein said first processing stage comprises a tree topology network of time delay channels having a plurality of tree-levels, connected in between said first port and said L ports and defining said plurality of L paths; whereby each level in said tree topology network is operative at a different sampling rate and the time delay channels of each level are configured and operable for offsetting the signals processed thereby by an integer number greater or equal to zero of samples of the sampling rate of the level and converting the sampling rate of the signal to the sampling rate of a next level in the tree topology network.

23. The multipath time delay filter claim 21, comprising at least one basic module configured for connection between said first signal port that is operable with signals sampled at said high sampling rate $SR_1$ and a plurality of N second signal ports operable with signals sampled at a lower sampling rate $SR_2$, wherein $SR_2 < SR_1$;
   said basic module comprising: said first processing stage and a second processing stages connected respectively between the first signal port and the N second signal ports, and a path selector multiplexer module adapted for managing signal coupling between the first and second processing stages;
   said second processing stage comprises an array of N second type digital time delay channels connected to said N second signal ports, respectively, and each of the second type digital time delay channels being operable for shifting a signal communicated therethrough by any number between 0 and K samples of the lower sampling rate $SR_2$; and
   said path selector multiplexer module is configured and operable for selectively linking any one of said L network ports with any one or more of said N second type digital time delay channels.

24. A signal processing circuit comprising the multipath time delay filter according to claim 21.

\* \* \* \* \*